US008150171B2

(12) United States Patent
Yamaguchi et al.

(10) Patent No.: US 8,150,171 B2
(45) Date of Patent: Apr. 3, 2012

(54) APPARATUS FOR AND METHOD OF DECODING MOVING PICTURE, AND COMPUTER PRODUCT

(75) Inventors: Yousuke Yamaguchi, Fukuoka (JP); Yuji Nomura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1689 days.

(21) Appl. No.: 11/252,806

(22) Filed: Oct. 19, 2005

(65) Prior Publication Data

US 2007/0009037 A1  Jan. 11, 2007

(30) Foreign Application Priority Data

Jul. 8, 2005  (JP) ................................. 2005-200515

(51) Int. Cl.
*H04N 11/02* (2006.01)
*H04N 11/04* (2006.01)
*H04B 1/66* (2006.01)

(52) U.S. Cl. ............... 382/232; 375/240.16; 375/240.24; 375/240.27

(58) Field of Classification Search .................. 382/232; 375/240.16
See application file for complete search history.

(56) References Cited

U.S. PATENT DOCUMENTS

| | | | |
|---|---|---|---|
| 5,420,872 A * | 5/1995 | Hyodo et al. | 714/747 |
| 5,886,744 A * | 3/1999 | Hannah | 375/240.16 |
| 6,748,113 B1 * | 6/2004 | Kondo et al. | 382/232 |
| 7,564,902 B2 * | 7/2009 | Sasai et al. | 375/240.26 |
| 2004/0052507 A1 * | 3/2004 | Kondo et al. | 386/111 |

FOREIGN PATENT DOCUMENTS

| | | |
|---|---|---|
| JP | 6-311502 | 11/1994 |
| JP | 9-154141 | 6/1997 |
| JP | 9-182076 | 7/1997 |
| JP | 2000-236522 | 8/2000 |
| JP | 2001-309388 | 11/2001 |
| JP | 2002-290978 | 10/2002 |
| JP | 2003-179937 | 6/2003 |
| JP | 2003-289541 | 10/2003 |

OTHER PUBLICATIONS

Japanese Office Action for corresponding Japanese Application 2005-200515; mailed Feb. 23, 2010.

* cited by examiner

*Primary Examiner* — Vu Le
*Assistant Examiner* — Michael Vanchy, Jr.
(74) *Attorney, Agent, or Firm* — Fujitsu Patent Center

(57) ABSTRACT

In a moving picture decoding apparatus, a variable-length decoding circuit decodes motion vectors for each macroblock from a bit stream and stores the motion vectors. An error correction circuit calculates a reference vector for an error macroblock using the motion vectors to generate a corrected picture from a reference picture. An inverse-orthogonal transform circuit stores a difference value between direct-current (DC) components after Inverse Discrete Cosine Transform (IDCT) is performed thereon, in the memory for each macroblock. The error correction circuit further calculates a difference value of the DC component of the error macroblock using the difference values of DC components stored in the memory, to add the difference value calculated to the corrected picture generated from the reference picture.

10 Claims, 22 Drawing Sheets

FIG.3A

| | PICTURE TYPE : I PICTURE | | | | | |
| --- | --- | --- | --- | --- | --- | --- |
| | | | TEMPORAL REFERENCE : 0 | | | |
| MACRO-BLOCK NUMBER | SkipMB FLAG | DCT TYPE | MOTION VECTOR (X) | MOTION VECTOR (Y) | EDGE DETERMINATION FLAG | DIFFERENCE VALUE OF DC COMPONENTS |
| 0 | VALID | frame | +7.5 | +3.0 | SET | SEE FIG. 3B |
| 1 | INVALID | frame | -2.0 | -2.0 | NOT SET | |
| ⋮ | | | | | | |
| n | | | | | | |

FIG.3B

| MACROBLOCK NUMBER | BLOCK NUMBER | COEFFICIENT (0,0) | COEFFICIENT (1,0) | COEFFICIENT (2,0) | ... | COEFFICIENT (5,7) | COEFFICIENT (6,7) | COEFFICIENT (7,7) |
|---|---|---|---|---|---|---|---|---|
| 0 | 0 | 128 | 129 | 129 | ... | 128 | 128 | 128 |
| | 1 | 126 | 126 | 126 | ... | 128 | 128 | 128 |
| | 2 | 126 | 126 | 126 | ... | 128 | 129 | 128 |
| | 3 | 126 | 126 | 126 | ... | 128 | 128 | 128 |
| | 4 | 128 | 129 | 129 | ... | 128 | 128 | 128 |
| | 5 | 128 | 128 | 126 | ... | 128 | 129 | 128 |
| 1 | 0 | 127 | 128 | 129 | ... | 127 | 128 | 128 |
| | 1 | 127 | 128 | 129 | ... | 128 | 128 | 128 |
| | 2 | 127 | 128 | 129 | ... | 128 | 127 | 128 |
| ⋮ | | | | | | | | |
| n | 5 | 224 | 212 | 212 | ... | 192 | 192 | 192 | n FRAME    n+1 FRAME    n+2 FRAME

| TEMPORAL REFERENCE | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| PICTURE TYPE | I | P | P | P | P | P | P | P | P | P | P | P | P | P | P |
| DECODING ORDER | 0 | 1 | 2 | 3 | 4 | 5 | 6 | 7 | 8 | 9 | 10 | 11 | 12 | 13 | 14 |

| TEMPORAL REFERENCE | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| PICTURE TYPE | I | B | B | P | B | B | P | B | B | P | B | B | P | B | B |
| DECODING ORDER | 0 | 2 | 3 | 1 | 5 | 6 | 4 | 8 | 9 | 7 | 11 | 12 | 10 | 14 | 15 |

|  | A | B | C | D |  |  |
|---|---|---|---|---|---|---|
| LEFT | \|A-E\| | \|B-F\| | \|C-B\| | \|D-C\| | →SUM | SUM_X1 |
| UPPER LEFT | \|A-F\| | \|B-G\| | \|C-H\| | \|D-I\| | →SUM | SUM_X2 |
| UPPER | \|A-B\| | \|B-H\| | \|C-I\| | \|D-J\| | →SUM | SUM_X3 |
| UPPER RIGHT | \|A-C\| | \|B-I\| | \|C-J\| | \|D-K\| | →SUM | SUM_X4 |
|  | ↓ SUM | ↓ SUM | ↓ SUM | ↓ SUM |  |  |
|  | SUM_Y1 | SUM_Y2 | SUM_Y3 | SUM_Y4 | →SUM | SUM_Y |

FIG.19

| | | | |
|---|---|---|---|
| A | \|\|A-E\|+\|A-F\|+\|A-B\|+\|A-C\|\| | = | SUM_X1 |
| B | \|\|B-F\|+\|B-G\|+\|B-H\|+\|B-I\|\| | = | SUM_X2 |
| C | \|\|C-B\|+\|C-H\|+\|C-I\|+\|C-J\|\| | = | SUM_X3 |
| D | \|\|D-C\|+\|D-I\|+\|D-J\|+\|D-K\|\| | = | SUM_X4 |
| | | | ↓ SUM |
| | | | SUM_Y |

FIG.21
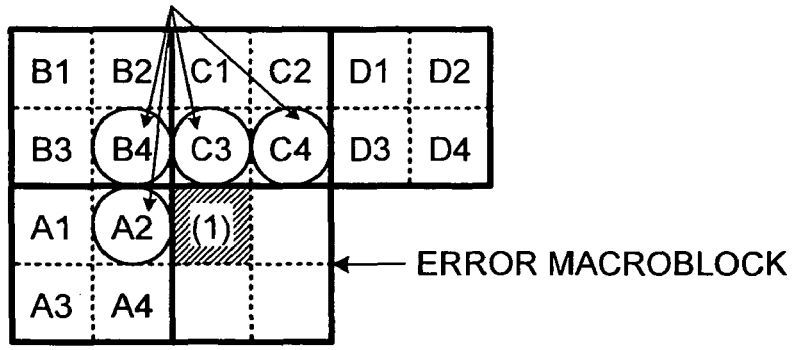
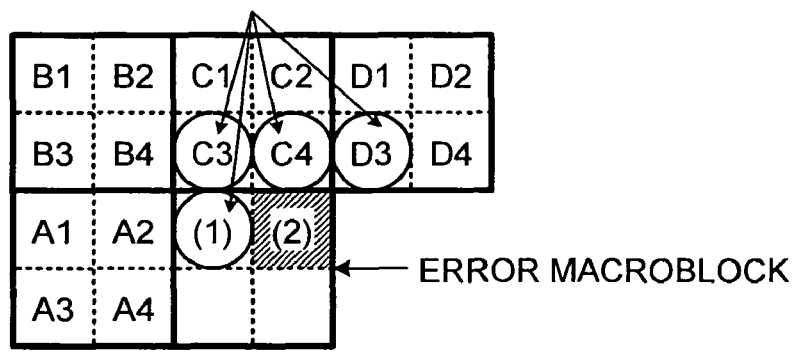
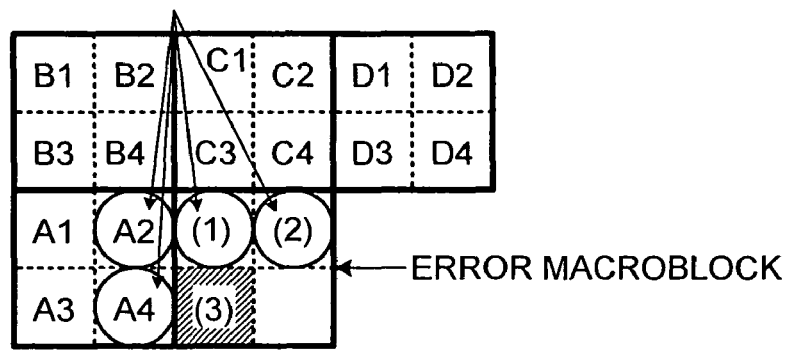
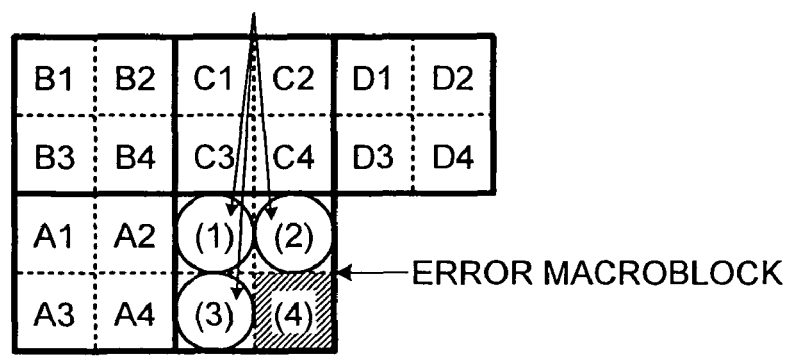

FIG.22

|  | A2 | B4 | C3 | C4 |  |  |
|---|---|---|---|---|---|---|
| LEFT | \|A2-A1\| | \|B4-B3\| | \|C3-B4\| | \|C4-C3\| | →SUM | SUM_X1 |
| UPPER LEFT | \|A2-B3\| | \|B4-B1\| | \|C3-B2\| | \|C4-C1\| | →SUM | SUM_X2 |
| UPPER | \|A2-B4\| | \|B4-B2\| | \|C3-C1\| | \|C4-C2\| | →SUM | SUM_X3 |
| UPPER RIGHT | \|A2-C3\| | \|B4-C1\| | \|C3-C2\| | \|C4-D1\| | →SUM | SUM_X4 |
|  | ↓SUM | ↓SUM | ↓SUM | ↓SUM |  |  |
|  | SUM_Y1 | SUM_Y2 | SUM_Y3 | SUM_Y4 | →SUM | SUM_Y |

FIG.24

|  |  |  |  |
|---|---|---|---|
| A2 | ‖|A2-A1|+|A2-B3|+|A2-B4|+|A2-C3|‖ | = | SUM_X1 |
| B4 | ‖|B4-B3|+|B4-B1|+|B4-B2|+|B4-C1|‖ | = | SUM_X2 |
| C3 | ‖|C3-B4|+|C3-B2|+|C3-C1|+|C3-C2|‖ | = | SUM_X3 |
| C4 | ‖|C4-C3|+|C4-C1|+|C4-C2|+|C4-D1|‖ | = | SUM_X4 |
|  |  |  | ↓ SUM |
|  |  |  | SUM_Y |

APPARATUS FOR AND METHOD OF DECODING MOVING PICTURE, AND COMPUTER PRODUCT

BACKGROUND OF THE INVENTION

1. Field of the Invention

The present invention relates to a technology for encoding a moving picture using a motion vector. More particularly, this invention relates to a technology for performing high-precision error correction using a motion vector without performing a motion search.

2. Description of the Related Art

In picture transmission systems, if a transmission error occurs, a decoding process is not successfully performed in a decoder, and at worst, the decoder may hang. According to Moving Picture Experts Group (MPEG), if a decoding error once occurs, the decoding process cannot be performed until it reaches a next recovery point, and occurrence of an error becomes a significant cause of picture degradation.

Following two measures have been taken so far against the decoding error:

(1) Assume that an MPEG decoder includes a motion search circuit. In this case, when detecting a decoding error, the MPEG decoder recognizes an error position, and temporally handles a reference picture in a previous frame from the frame in which an error has occurred, as a corrected picture for the error position, as it is.

(2) Assume that an MPEG decoder includes a motion search circuit. In this case, when detecting a decoding error, the MPEG decoder recognizes an error position, and executes a motion search to an adjacent macroblock (MB) related to the error position. Then, the MPEG decoder acquires a corrected picture from a reference picture using the result of motion search.

A conventional MPEG decoder has been disclosed in, for example, Japanese Patent Application Laid-Open No. 2001-309388.

In the case of (1), however, since the reference picture in the temporally previous frame is used as the corrected picture for the error position, the picture in the previous frame is followed by the same picture. Therefore, it seems as if the video is motionless.

In the case of (2), to incorporate the motion search circuit, the size of the MPEG decoder becomes large. In addition, because the MPEG decoder executes the motion search in, amount of processing increases, which lengthens the processing time.

SUMMARY OF THE INVENTION

It is an object of the present invention to at least solve the problems in the conventional technology.

According to an aspect of the present invention, a moving picture decoding apparatus that processes an encoded bit stream to obtain a moving picture, wherein the encoded bit stream represents a moving picture that has been encoded using a motion vector of each of an array of block in each frame of the moving picture, includes a storing unit that stores therein motion vectors detected from the encoded bit stream of each block; and an error correction unit that detects at least one block adjacent to an error block, which is decided based on motion vectors stored in the storing unit, and corrects the value of adjacent block based on a value of a block in a reference frame that corresponds to the adjacent block.

According to another aspect of the present invention, a method of decoding moving picture including processing an encoded bit stream to obtain a moving picture, wherein the encoded bit stream represents a moving picture that has been encoded using a motion vector of each of an array of block in each frame of the moving picture, includes storing motion vectors detected from the encoded bit stream of each block; and detecting at least one block adjacent to an error block, which is decided based on motion vectors stored in the storing unit, and correcting the value of adjacent block based on a value of a block in a reference frame that corresponds to the adjacent block.

According to still another aspect of the present invention, a computer-readable recording medium stores therein a computer program that implements a method of decoding moving picture according to the present invention on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3A is a table that depicts the contents of a correction parameter memory shown in FIG. 2;

FIG. 3B is a diagram of difference values of DC components;

FIG. 19 is a schematic to explain a calculation equation of a denominator and a numerator in a ratio when the ratio is calculated using a correlation between adjacent macroblocks;

FIG. 21 is a schematic of blocks used to calculate each difference value of DC components;

FIG. 22 is a schematic to explain a calculation equation of a denominator and a numerator in each ratio between difference values of DC components of blocks at the left position, the upper left position, the upper position, and the upper right position with respect to a block (1) when each difference value of DC components for the block (1) is calculated;

FIG. 24 is a schematic to explain a calculation equation of a denominator and a numerator in a ratio when the ratio is calculated using a correlation between adjacent blocks;

DETAILED DESCRIPTION OF THE PREFERRED EMBODIMENTS

Exemplary embodiments of the present invention are explained in detail below with reference to the accompanying drawings. In the following embodiments, the present invention is explained mainly by referring to encoding and decoding of a moving picture using MPEG.

Figure 1:
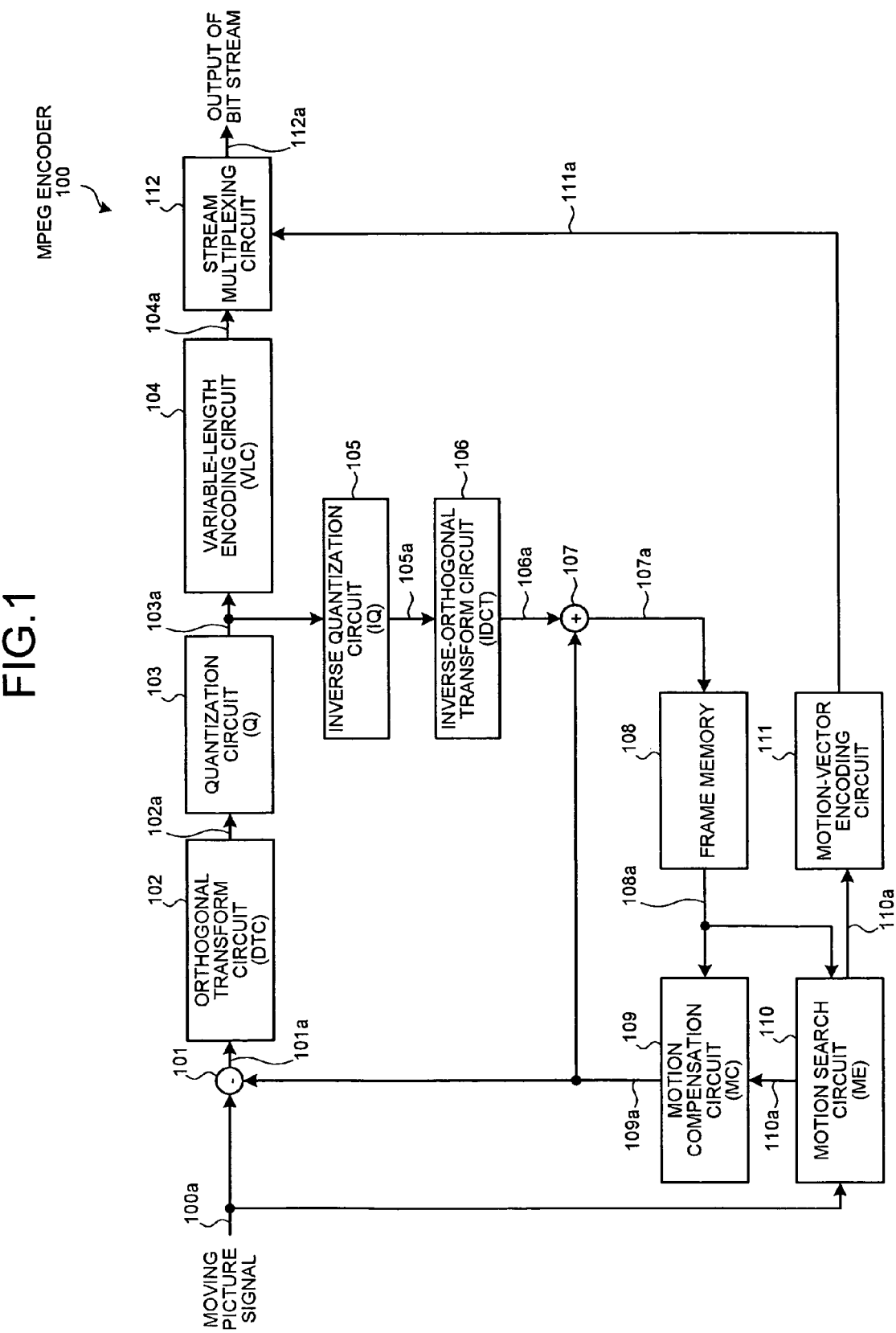
FIG. 1 is a functional block diagram of an MPEG encoder according to an embodiment of the present invention.

FIG. 1 is a functional block diagram of an MPEG encoder 100 according to an embodiment of the present invention. The MPEG encoder 100 includes a subtractor 101, an orthogonal transform circuit 102, a quantization circuit 103, a variable-length encoding circuit 104, an inverse quantization circuit 105, an inverse-orthogonal transform circuit 106, an adder 107, a frame memory 108, a motion compensation circuit 109, a motion search circuit 110, a motion-vector encoding circuit 111, and a stream multiplexing circuit 112.

How an intra coded picture (I-picture) coding is performed is explained first. Intra-frame coding is performed in the I-picture coding. A moving picture signal 100a is supplied to the orthogonal transform circuit 102; because, the subtractor 101 is not activated in I-picture coding. The orthogonal transform circuit 102 removes redundancy from a frame to encode the moving picture signal 100a. More specifically, the orthogonal transform circuit 102 transforms the moving picture signal 100a to a frequency component for each block of a predetermined size using, for example, Discrete Cosine Transform (DCT).

A transform coefficient 102a, which is obtained as a result of the orthogonal transform, is supplied to the quantization circuit 103 (Q). The quantization circuit 103 quantizes the transform coefficient 102a to obtain a quantized code 103a and supplies the code 103a to the variable-length encoding circuit 104 and the inverse quantization circuit 105.

The variable-length encoding circuit 104 (VLC) variable-length-encodes the code 103a to obtain a variable-length-encoded code 104a, and supplies the code 104a to the stream multiplexing circuit 112 in macroblocks. The stream multiplexing circuit 112 creates an encoded bit stream 112a with the code 104a and a corresponding header, and outputs the encoded bit stream 112a.

On the other hand, the inverse quantization circuit 105 (IQ) inversely quantizes the code 103a to obtain an inversely quantized code (i.e., transform coefficient) 105a, which is the transform coefficient of the original frequency component, and supplies the transform coefficient 105a to the inverse-orthogonal transform circuit 106 (IDCT). The inverse-orthogonal transform circuit 106 inversely orthogonal-transforms the transform coefficient 105a of the frequency component to a picture signal to obtain an inversely orthogonal-transformed code 106a as a picture signal for a current frame, and supplies the code 106a to the frame memory 108. Note that the adder 107 is not activated upon I-picture coding. The frame memory 108 is for sequentially accumulating the decoded picture data. The motion compensation circuit 109 and the motion search circuit 110 read the picture data from the frame memory 108, as necessary, when inter-frame prediction is performed in predictive coded picture (P-picture) and bidirectionally-predictive coded picture (B-picture) coding.

How a P-picture coding and a B-picture coding is performed is explained now. Inter-frame prediction is performed in the P-picture coding and the B-picture coding. In the P-picture coding and B-picture coding, the moving picture signal 100a is supplied to the subtractor 101. The subtractor 101 removes redundancy between the current frame and the previous frame to obtain a difference value 101a, and supplies the difference value 101a to the orthogonal transform circuit 102. The difference value 101a is a difference between pixel values the moving picture signal 100a, which is a signal for the current frame, and a picture signal 109a, which is a signal for the previous frame, that is output from the motion compensation circuit 109. The picture signal 109a represents a motion compensated signal. The difference value 101a is supplied to the orthogonal transform circuit 102. The orthogonal transform circuit 102 removes redundancy from the difference value 101a to obtain the transform coefficient 102a, and supplies the transform coefficient 102a to the quantization circuit 103. The quantization circuit 103 obtains the code 103a from the transform coefficient 102a, and supplies the code 103a to the variable-length encoding circuit 104 and the inverse quantization circuit 105.

The variable-length encoding circuit variable-length-encodes the code 103a to obtain the variable-length-encoded code 104a, and supplies the code 104a to the stream multiplexing circuit 112 in macroblocks. The stream multiplexing circuit 112 creates an encoded bit stream 112a with the code 104a, an encoded signal 111a from the motion-vector encoding circuit 111, and a corresponding header, and outputs the encoded bit stream 112a.

On the other hand, the inverse quantization circuit 105 inversely quantizes the code 103a to obtain the transform coefficient 105a, and supplies the transform coefficient 105a to the inverse-orthogonal transform circuit 106. The inverse-orthogonal transform circuit 106 inversely orthogonal-transforms the transform coefficient 105a of the frequency component to a picture signal to obtain an inversely orthogonal-transformed code 106a, and supplies the code 106a to the adder 107. The adder 107 adds the picture signal 109a to the code 106a to reproduce a picture signal 107a for the current frame. The picture signal 107a is stored in the frame memory 108.

The motion search circuit 110 (ME) detects a motion vector 110a representing the magnitude and the direction of a motion in an inter-frame picture, from the picture signal 100a for the current frame and a picture signal 108a for the previous frame or the subsequent frame in each predetermined unit. The motion search circuit 110 supplies the motion vector 110a to the motion compensation circuit 109 and the motion-vector encoding circuit 111.

The motion compensation circuit 109 (MC) reads a picture signal 108a from the frame memory 108 to perform motion-compensation with respect to the read picture signal 108a. The motion compensation circuit 109 performs the motion-compensation by shifting a portion where there is a motion to a position in the current frame according to the motion. That is, the motion compensation circuit 109 is a signal compensation circuit that motion-compensates in each predetermined unit using the motion vector 110a detected in the motion search circuit 110. The motion compensation circuit 109 outputs picture signal 109a obtained as a result of the motion-compensation to the subtractor 101 and the adder 107.

Figure 2:
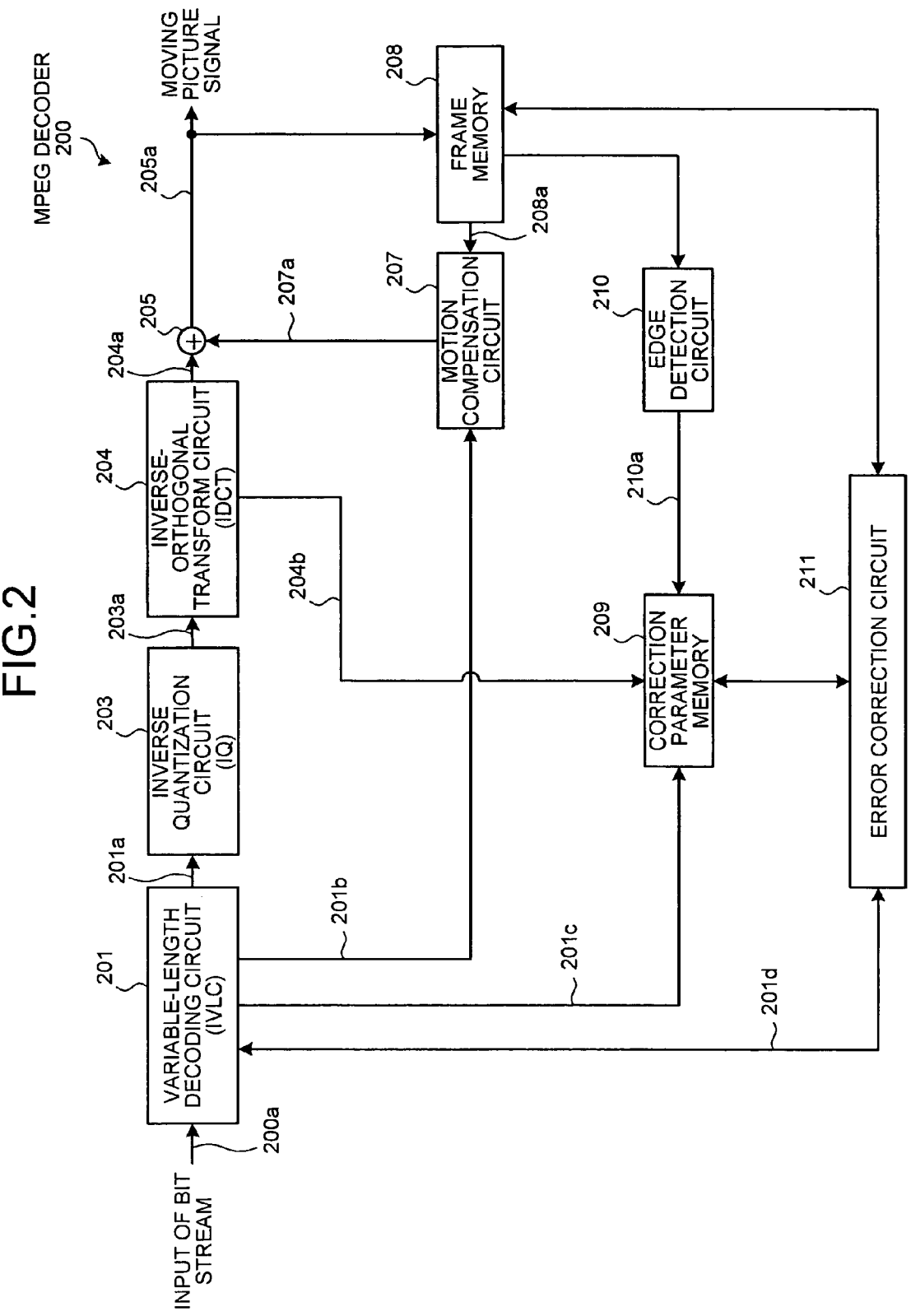
FIG. 2 is a functional block diagram of an MPEG decoder according to the embodiment.

FIG. 2 is a functional block diagram of an MPEG decoder 200 according to the embodiment. The MPEG decoder 200 decodes the encoded signal, i.e., the encoded bit stream 112a, that is output from the MPEG encoder 100 to reproduce the original picture signal 100a.

As shown in FIG. 2, the MPEG decoder 200 includes a variable-length decoding circuit 201, an inverse quantization circuit 203, an inverse-orthogonal transform circuit 204, an adder 205, a motion compensation circuit 207, a frame memory 208, a correction parameter memory 209, an edge detection circuit 210, and an error correction circuit 211.

The operation of the MPEG encoder 100 when the input encoded stream is free of error and when the input encoded stream has been subjected to I-picture coding is explained first. The variable-length decoding circuit 201 receives such an encoded bit stream 200a, which is same as the encoded bit stream 112a. The variable-length decoding circuit 201, based on the header in the encoded bit stream 200a, separates an encoded signal corresponding to picture data or an encoded signal corresponding to a motion vector, and sequentially variable-length-decodes these signals to obtain a decoded signal 201a corresponding to the picture data and a decoded signal 201b corresponding to the motion vector. The variable-length decoding circuit 201 supplies the decoded signal 201b to the motion compensation circuit 207, and supplies the decoded signal 201a to the inverse quantization circuit 203.

The inverse quantization circuit 203 inversely quantizes the decoded signal 201a to an original transform coefficient to obtain a transform coefficient 203a for each original frequency component at a quantization step allocated for each frequency component in the quantization circuit 103 of the MPEG encoder 100, and supplies the transform coefficient 203a to the inverse-orthogonal transform circuit 204.

The inverse-orthogonal transform circuit 204 inversely transforms the transform coefficient 203a to an original picture signal, and decodes the transform coefficient to the original picture signal 204a by substantially reversing the order of the processes in the orthogonal transform circuit 102 of the MPEG encoder 100. When I-picture is to be decoded, since the adder 205 is not activated, the inverse-orthogonal transform circuit 204 outputs the picture signal 204a as a moving picture signal, and also stores the picture signal 204a into the frame memory 208.

The frame memory 208 stores therein the picture data 204a and picture data 205a input from the adder 205 for each frame. The motion compensation circuit 207 reads the picture data from the frame memory 208, as necessary, when performing motion compensation.

The operation of the MPEG encoder 100 when the input encoded stream if free of error and when the input encoded stream has been subjected to P-picture coding or B-picture coding is explained below. The variable-length decoding circuit 201 receives such an encoded bit stream 200a, which is same as the encoded bit stream 112a. The variable-length decoding circuit 201, based on the header in the encoded bit stream 200a, separates an encoded signal corresponding to picture data or an encoded signal corresponding to a motion vector, and sequentially variable-length-decodes these signals to obtain a decoded signal 201a corresponding to the picture data and a decoded signal 201b corresponding to the motion vector. The variable-length decoding circuit 201 supplies the decoded signal 201b to the motion compensation circuit 207, and supplies the decoded signal 201a to the inverse quantization circuit 203.

The inverse quantization circuit 203 inversely quantizes the decoded signal 201a to an original transform coefficient to obtain a transform coefficient 203a for each original frequency component at a quantization step allocated for each frequency component in the quantization circuit 103 of the MPEG encoder 100, and supplies the transform coefficient 203a to the inverse-orthogonal transform circuit 204. The inverse-orthogonal transform circuit 204 inversely transforms the transform coefficient 203a to an original picture signal, and decodes the transform coefficient to the original picture signal 204a by substantially reversing the order of the processes in the orthogonal transform circuit 102 of the MPEG encoder 100. The inverse-orthogonal transform circuit 204 outputs the picture signal 204a to the adder 205. The adder 205 adds a picture signal 207a, which has been motion-compensated and which is output from the motion compensation circuit 207, to the picture signal 204a, which is output from the inverse orthogonal transform circuit 204. The adder 205 adds picture data of which a previous frame has been subjected to motion compensation to the picture signal 204a in the case of P-picture, and adds picture data of which a previous frame and the subsequent frame have been subjected to motion compensation to the picture signal 204a in the case of B-picture. The adder 205 outputs the resultant signal obtained by adding the picture signal 204a and the picture data 207a as a moving picture signal to the frame memory 208. The frame memory 208 stores therein the resultant signal.

The motion compensation circuit 207 is a motion correction circuit that motion-corrects picture data 208a for the previous frame stored in the frame memory 208, based on the motion vector signal 201b input from the variable-length decoding circuit 201. More specifically, the motion compensation circuit 207 motion-compensates picture data for I-picture or P-picture in the previous frame in the case of P-picture, and motion-compensates picture data for I-picture or P-picture in the previous frame and picture data for I-picture or P-picture in the subsequent frame decoded thereafter, in the case of B-picture. Picture data 207a motion-compensated is supplied to the adder 205.

The variable-length decoding circuit 201 analyses the header of the encoded bit stream 200a, detects temporal reference, a picture type, a SkipMB flag, a DCT type, and a motion vector and accumulate information 201c obtained as a result of the analysis in the correction parameter memory 209. The inverse-orthogonal transform circuit 204 accumulates a difference value 204b of direct current (DC) components after being subjected to Inverse Discrete Cosine Transform (IDCT). The edge detection circuit 210 reads the picture data from the frame memory 208 and performs edge detection with respect to the picture data using a predetermined method, to obtain an edge detection result 210a, and stores the edge detection result 210a in the correction parameter memory 209. The information accumulated in the correction parameter memory 209 is hereinafter called "parameters".

FIG. 3A is a table that depicts the parameters stored in the correction parameter memory 209. The correction parameter memory 209 stores therein a picture type, temporal reference, and information for each macroblock for each picture. The information for each macroblock includes, for example, a macroblock number indicating a number of macroblock, the SkipMB flag indicating whether a decoded picture is the same picture as the reference picture, the DCT type, motion vectors X and Y decoded, an edge determination flag indicating the result of edge detection, and difference values of DC components.

FIG. 3B is a diagram of difference values of DC components. Referring to the difference value of DC components, a coefficient after IDCT is stored, and the coefficients are 8×8, i.e. coefficient (0, 0) to coefficient (7, 7), pieces in each of 6 blocks per 1 macroblock.

The error correction circuit 211 decides an error area, and performs error correction on the macroblock belonging to the error area. More specifically, the error correction circuit 211 performs an error correction process that includes SkipMB determination, reference vector calculation, and addition of a difference value of DC components. The processes performed by the error correction circuit 211 are explained in detail below.

How the error correction circuit 211 decides an error area is explained first. In MPEG, since picture data is encoded to remove redundancy, if there is an error somewhere in the encoded data, the decoding process cannot successfully be performed until the next recovery point. Therefore, the error correction circuit 211 must decide an error area as early as possible.

The variable-length decoding circuit 201 detects whether a decoding error has occurred during decoding of the bit stream 200a. The decoding error can be a header error or a structure error. The header error is an error in which a value not allowed according to the specification is included in the header of the bit stream. The structure error is an error in which the order of the streams is not proper or a part of the data is missing. If a decoding error has occurred, the variable-length decoding circuit 201 informs the error correction circuit 211 of a signal 201d indicative of the macroblock in which the error has occurred.

When the error correction circuit 211 receives the signal 201d, the error correction circuit 211 and the variable-length decoding circuit 201 perform a process of skipping a portion of the encoded stream up to the next recovery point in the encoded stream. The recovery point is a location where next alignment can be made. For example, in MPEG-2 the recovery point is a slice header, and in MPEG-4 it is a video packet header. In this case, in particular, since the recovery point is not specified, it indicates that skipping is performed over the stream up to location where the alignment is made. Because the error correction circuit 211 has the number of the error macroblock and a number of a recoverable macroblock, the error correction circuit 211 can decide an error area, which are the macroblocks present between the error macroblock and the recoverable macroblock.

Figures 4, 5:
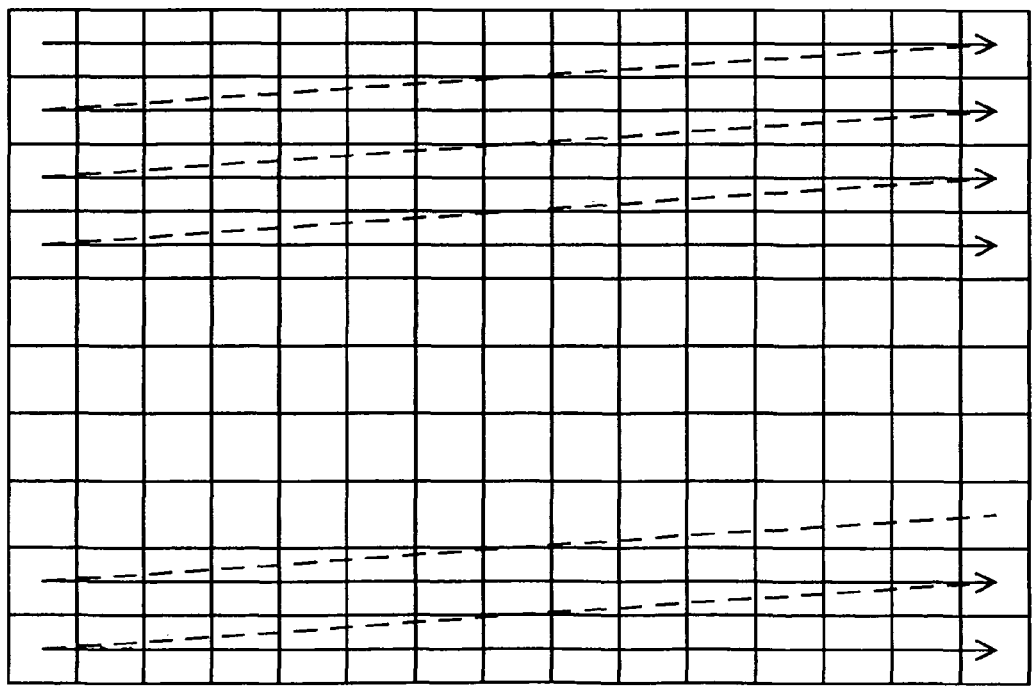
FIG. 4 is a schematic for explaining macroblocks and macroblock numbers.
FIG. 5 is a schematic for explaining a decoding order of macroblocks.

As shown in FIG. 4, a frame can be divided into an array of macroblocks. Each macroblock includes an array of 16×16 pixels. In MPEG, the all the processes are performed macroblock by macroblock. Moreover, the processes are sequentially performed for macroblocks in one line as shown in FIG. 5. The dashed lines in FIG. 5 show that the first macroblock in the next line is processed when processing of the last macroblock in the previous line is finished.

Figure 6:
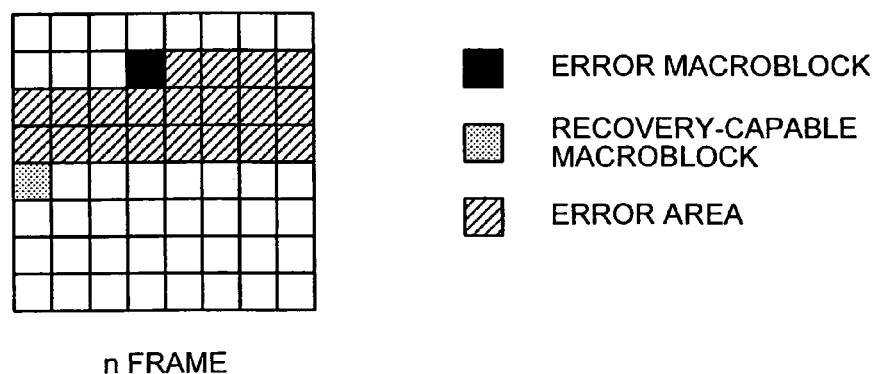
FIG. 6 is a schematic of an error area.

FIG. 6 is a schematic to explain the error macroblock, the recoverable macroblock, and the error area in an n-th frame. The error area are the macroblocks present between the error macroblock and the recoverable macroblock.

Figure 7:
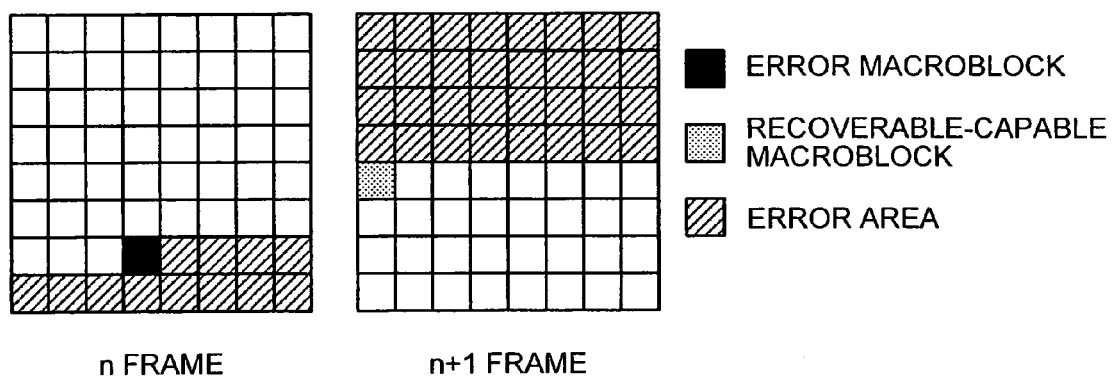
FIG. 7 is a schematic of an error area across frames.
Figures 8, 9, 10:
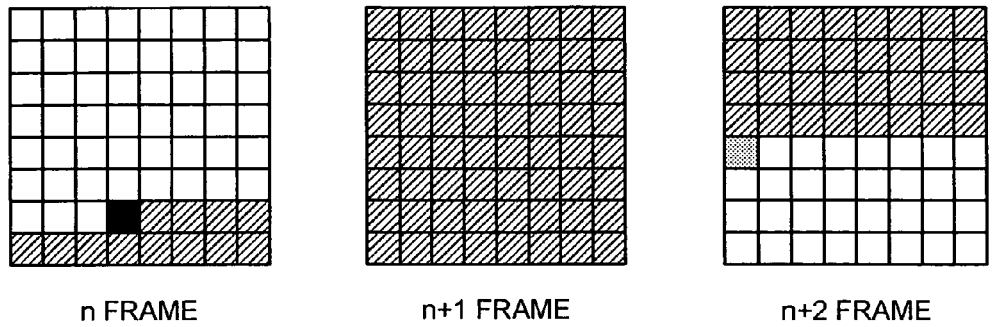
FIG. 8 is another schematic of an error area across frames.
FIG. 9 is a schematic of temporal reference (group of pictures (GOP) 15-IPPP structure)
FIG. 10 is a schematic of temporal reference (GOP 15-IBBP structure)

The error area can extend into adjacent frame or frames. FIG. 7 illustrates a case where the error area extends in two frames: n-th and n+1-st. FIG. 8 illustrates a case where the error area extends in three frames: n-th, n+1-st, and n+2-nd. In how many frames the error area extends can be determined from a value of the temporal reference shown in FIG. 9 or FIG. 10. The error correction circuit 211 performs error correction on each macroblock in the error area.

In this manner, the error correction circuit 211 can accurately decide an error area that is across the frames, by using the temporal reference value stored in the correction parameter memory 209.

The process of SkipMB determination performed by the error correction circuit 211 is explained below. By perform the SkipMB determination, the reference vector calculation (explained later) can be omitted. This is because, if a macroblock that is adjacent to an error macroblock or to a macroblock that belong to the error area (hereinafter, these macroblocks are also called "error macroblocks") is a SkipMB then it is quite possible that the macroblock that belong to the error area is a SkipMB as well, because, the adjacent macroblocks use the picture same as the reference picture as a decoded picture.

Figure 11:
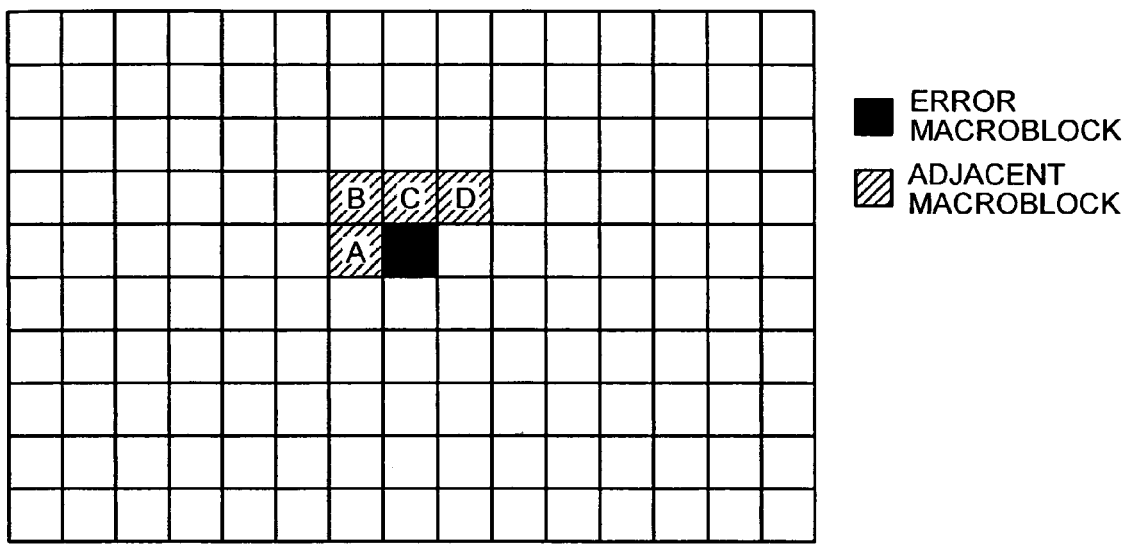
FIG. 11 is a diagram of adjacent macroblocks.

The error correction circuit 211 decides adjacent macroblocks. The adjacent macroblocks are the macroblock that are adjacent to the error macroblock and of which decoding process has been completed. More specifically, as shown in FIG. 11, macroblocks A to D are the adjacent macroblocks. The error correction circuit 211 determines whether the error macroblocks is a SkipMB based on the values of adjacent macroblocks. Sometimes an adjacent macroblock may not be present on one or more sides of the error macroblock, in which case, the process is performed using values of available adjacent macroblock(s).

The error correction circuit 211 performs SkipMB determination using a SkipMB flag of an adjacent macroblock. A macroblock of which SkipMB flag of FIG. 3A is valid is a macroblock of which decoding process is not performed and the process is performed so that a picture of a macroblock at the same position in a reference frame is set as an picture in the current frame. When the error macroblock is a SkipMB, the error correction circuit 211 replaces a picture of the error macroblock with a picture of a macroblock at the same position as the error macroblock in the reference frame.

At this step, the error correction circuit 211 checks the SkipMB flag of the adjacent macroblock, and determines whether the error MB is the SkipMB based on the number of SkipMBs. The number of SkipMBs can be set as a threshold from an external device. Furthermore, it is determined that the error macroblock having no adjacent macroblock is not the SkipMB. If the threshold is larger than the number of adjacent macroblocks and if all the adjacent macroblocks are Skip-MBs, the error macroblock is determined as the SkipMB. Even if an adjacent macroblock is determined as the SkipMB and corrected, the error correction circuit 211 performs the process on this adjacent macroblock as the SkipMB.

When the error macroblock is processed as the SkipMB, the error correction circuit 211 does not calculate a subsequent reference vector. Further, when a picture including an error macroblock is a picture that consists of macroblocks which are subjected to intra-frame prediction coding, i.e., I-picture, the error correction circuit 211 does not calculate the subsequent reference vector, as well. On the other hand, if it is determined that the error macroblock is not the SkipMB, the error correction circuit 211 calculates the subsequent reference vector.

The reference vector calculation is explained below. The reference vector calculation is performed to detect an area that can be a reference picture for an error macroblock, from a reference frame. The purpose to calculate the reference vector for an error macroblock is to search for a picture that can be a corrected picture for the error macroblock, from the reference picture.

Conventionally, the motion search circuit is made to be installed in a decoding circuit to calculate a reference vector from a decoded picture. This causes not only an increase in the circuit scale but also an increase in the processing time. Therefore, in the MPEG decoder 200, the reference vector (motion vector) is stored in the correction parameter memory 209 to be used. Furthermore, the reference vector is calculated by performing a load averaging process on a vector to be used, so that calculation with general versatility of reference vectors is achieved.

When it is determined that the SkipMB of the error macroblock is invalid, the error correction circuit 211 calculates reference vectors for the error macroblock. The calculation of the reference vector is performed by using information for four reference vectors of the adjacent macroblocks shown in FIG. 11 with respect to the error macroblock. Further, vector components in the x direction and the y direction are respectively calculated to decide a reference vector for the error macroblock. Then, the error correction circuit 211 reads a picture that can be a corrected picture, from the frame memory 208 based on the reference vector calculated. The details of the calculation of the reference value are explained later.

The process of addition of the difference value of DC components is explained below. The purpose to add the difference value of DC components is because a high-precision corrected picture is generated not only by using a picture, as it is, that can be a corrected picture in a reference frame, but also by adding a difference value of DC components calculated from an adjacent macroblock to the error macroblock, to a picture that can be a corrected picture.

The error correction circuit 211 generates a corrected picture for the error macroblock by adding the value obtained by averaging the difference values of DC components of the adjacent macroblocks to a picture that can be a corrected picture for the error macroblock, and writes the picture generated as a picture for the error macroblock to the frame memory 208.

Figure 12:
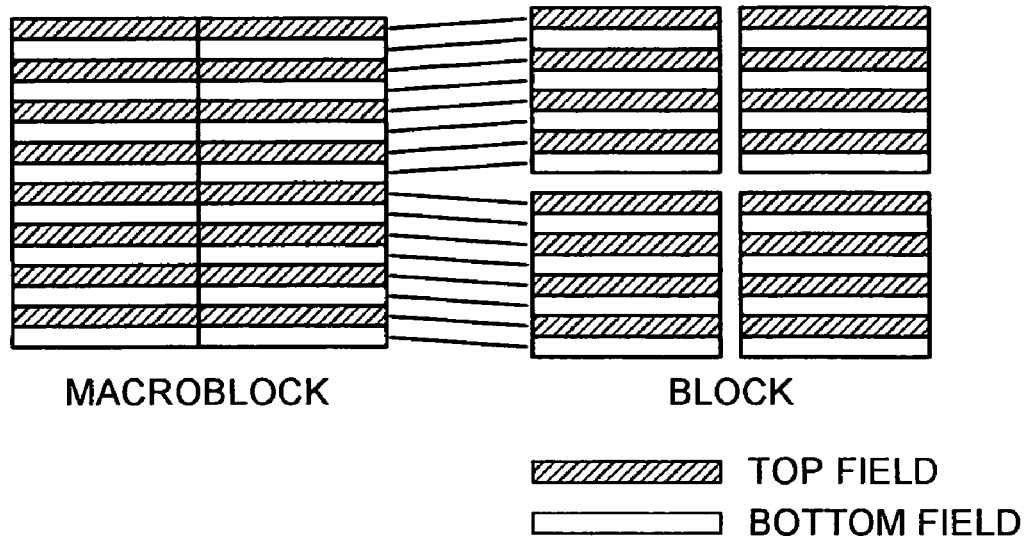
FIG. 12 is a diagram of frame DCT.

The error correction circuit 211 uses a DCT type and an edge determination flag of an adjacent macroblock upon calculation of the difference value of DC components to be added to the error macroblock. The DCT type includes frame DCT shown in FIG. 12 and field DCT shown in FIG. 13. If the DCT type is frame DCT when a difference value of DC components is calculated, the error correction circuit 211 can use the values of pixels of an adjacent macroblock as they are, but if the DCT type is field DCT, the error correction circuit 211 uses an average value of pixels of a top field and a bottom field.

The error correction circuit 211 checks an edge determination flag of the adjacent macroblock, and does not use the macroblock that includes the edge, for calculation of a difference value of DC components. The details of the calculation of a difference value of DC components are explained later.

Figure 14:
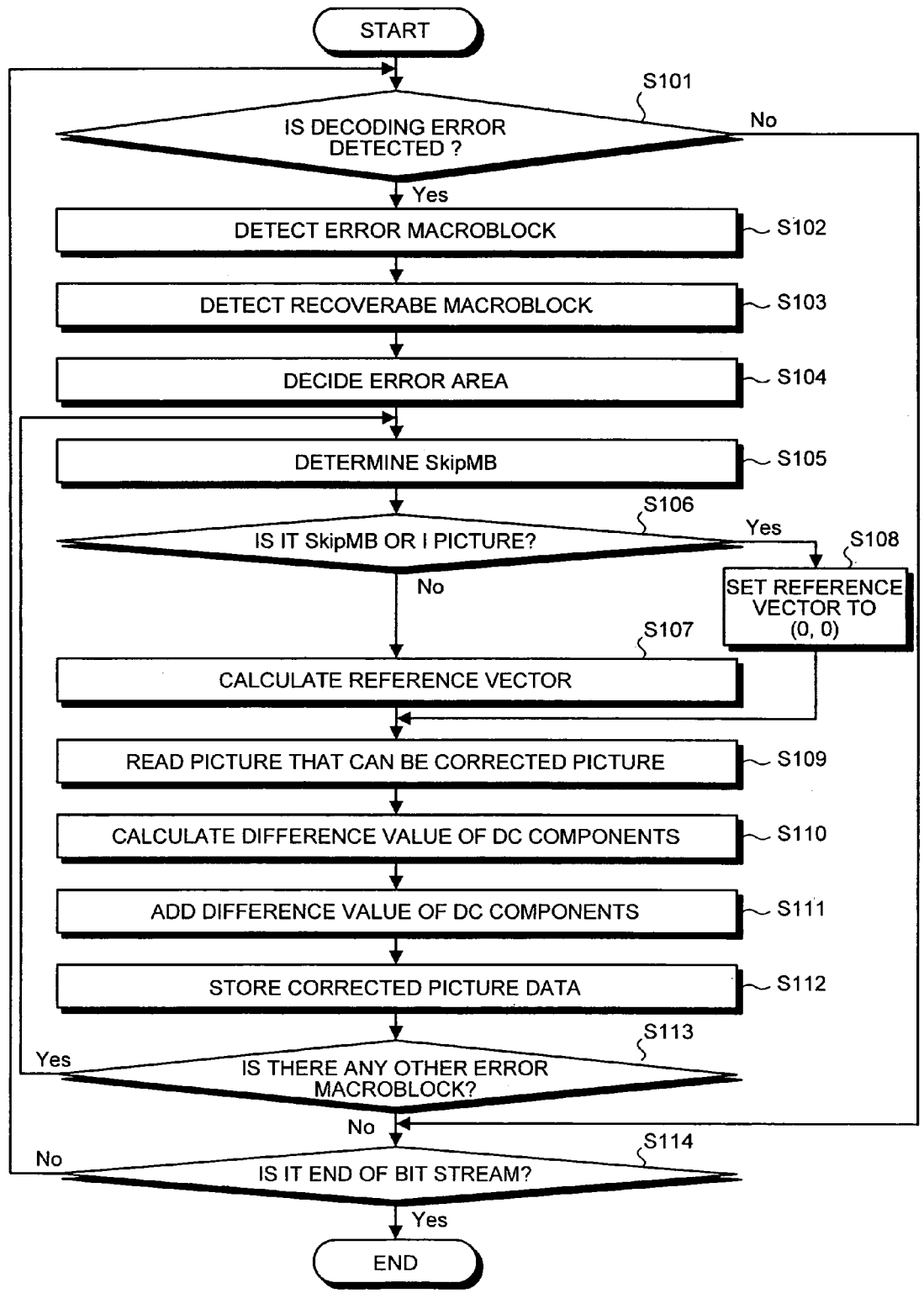
FIG. 14 is a flowchart of an error correction process performed by the MPEG decoder shown in FIG. 2.

FIG. 14 is a flowchart of an error correction process performed by the MPEG decoder 200. When the variable-length decoding circuit 201 detects a decoding error (step S101, Yes), it detects the number of the error macroblock (step S102) and a recoverable macroblock (step S103).

The error correction circuit 211 decides an error area using the error macroblock and the recoverable macroblock (step S104), and determines whether the error macroblock is a SkipMB (step S105).

The error correction circuit 211 determines whether the error macroblock is the SkipMB or a macroblock of I-picture (step S106). If it is determined that the error macroblock is neither the SkipMB nor the macroblock of I-picture, the error correction circuit 211 calculates a reference vector (step S107). If it is determined that the error macroblock is the SkipMB or the macroblock of I-picture, the error correction circuit 211 sets a reference vector to (0, 0) (step S108).

The error correction circuit 211 then reads a picture that can be a corrected picture from the frame memory 208 using the reference vector (step S109), calculates a difference value of DC components, and adds the difference value to the picture (step S110 to step S111).

The error correction circuit 211 writes the result of addition to the frame memory 208 as corrected picture data (step S112), and determines whether there is another error macroblock (step S113). If there is another error macroblock (step S113, Yes), process returns to step S105, where it is determined whether the subsequent error macroblock is the SkipMB. On the other hand, when the process for all the error macroblocks is finished, or when there is no error macroblock (step S113, No), the variable-length decoding circuit 201 continues detecting a decoding error until the stream ends (step S114, Yes).

In this manner, the error correction circuit 211 specifies an error area, calculates a reference vector and a difference value of DC components with respect to each macroblock in the error area using information for the macroblocks stored in the correction parameter memory 209, to generate a corrected picture, thereby generating a corrected picture with high precision.

Figure 15:
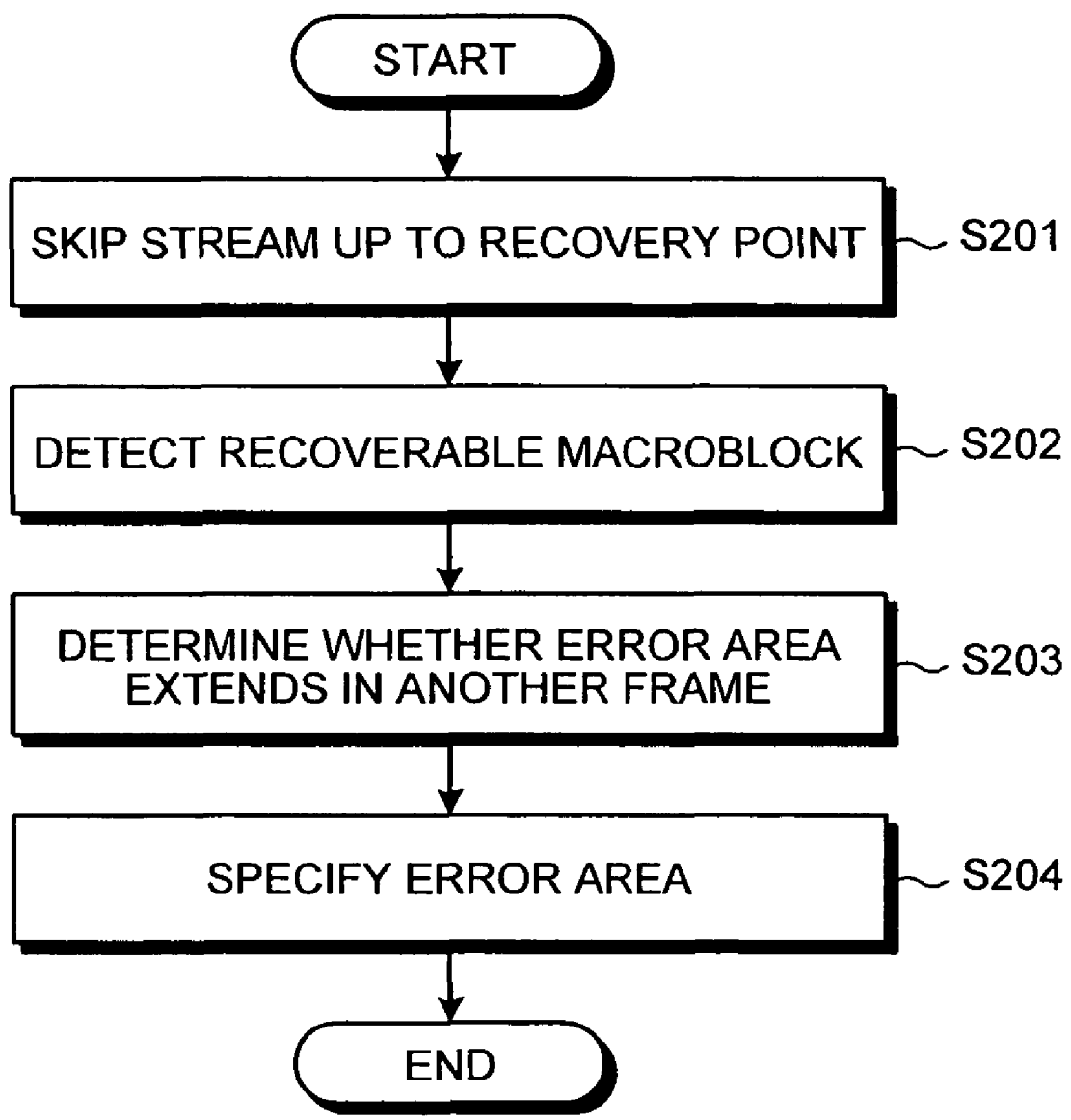
FIG. 15 is a flowchart of an error area specifying process performed by the MPEG decoder shown in FIG. 2.

FIG. 15 is a flowchart of an error area specifying process performed by the MPEG decoder 200. In the MPEG decoder 200, the stream is skipped up to a recovery point in the variable-length decoding circuit 201 (step S201), and a recoverable macroblock number is detected (step S202).

The error correction circuit 211 determines whether an error area is across frames, from temporal reference values (step S203), to specify the error area based-on the determination result (step S204).

In this manner, the error correction circuit 211 can correctly specifies an error area even if the error area is across frames by using temporal reference values.

Figure 16:
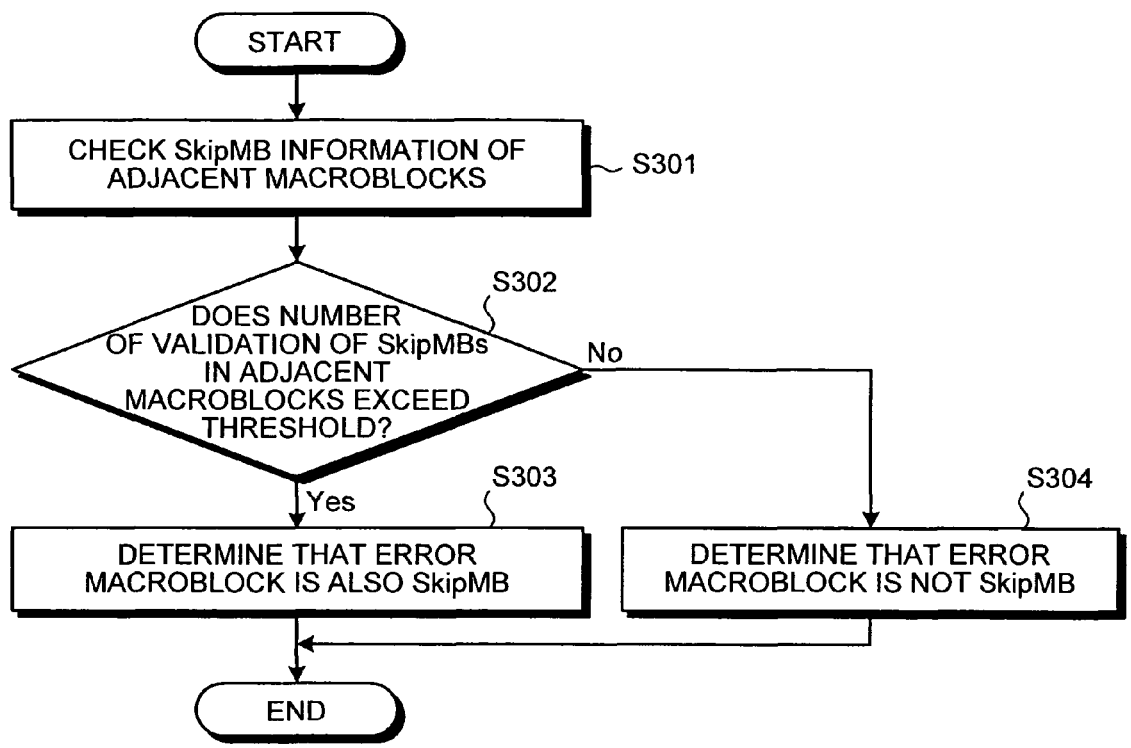
FIG. 16 is a flowchart of a process procedure for determining SkipMB performed by an error correction circuit shown in FIG. 2.

FIG. 16 is a flowchart of a process procedure for determining SkipMB performed by the error correction circuit 211. The operation of determining SkipMB corresponds to the operation at step S106 of FIG. 14.

As shown in FIG. 16, the error correction circuit 211 refers to the correction parameter memory 209 to check SkipMB information for A, B, C, and D as adjacent macroblocks (step S301). The adjacent macroblocks A, B, C, and D are the adjacent macroblocks shown in FIG. 11.

The error correction circuit 211 determines whether the number of SkipMBs of the adjacent macroblocks that are valid exceeds a predetermined threshold (step S302). If the number exceeds the predetermined threshold, it is determined that the error macroblock is also the SkipMB (step S303), but if the number does not exceed the predetermined threshold, it is determined that the error macroblock is not the SkipMB (step S304).

The error correction circuit 211 determines whether the error macroblock is the SkipMB using the SkipMB flag stored in the correction parameter memory 209, thereby omitting the process of calculating an unnecessary reference vector and making the process of error correction speed up.

The operation of calculating a reference vector for an error macroblock in the error correction circuit 211 is explained in detail below. The error correction circuit 211 calculates a vector difference between motion vectors of each of the adjacent macroblocks (A to D) to the error macroblock and each of macroblocks situated at the left position, the upper left position, the upper position, and the upper right position, and calculates, using the result of calculation, each ratio (weight of a weighted average) between the motion vectors of the macroblocks at the left position, the upper left position, the upper position, and the upper right position, the ratio being used to calculate a reference vector for the error macroblock. Any macroblock including the edge is omitted from a target to be calculated.

Figures 17A, 17B:
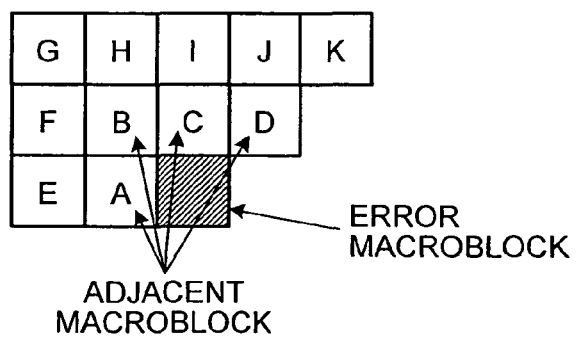
FIG. 17A is a schematic to explain a calculation equation used to calculate a reference vector for the error macroblock in the X direction.
FIG. 17B is a diagram indicating definition of macroblocks of A to K.

FIG. 17A is a schematic to explain a calculation equation of a denominator and a numerator in each ratio between motion vectors of macroblocks in leftward, upward and leftward, upward, and rightward directions with respect to an error macroblock, the calculation equation being used to calculate a reference vector for the error macroblock in the X direction. In FIG. 17A, A to K indicate the macroblocks shown in FIG. 17B. Further, |A−E| indicates an absolute value of a difference between motion vectors of A and E in the x direction, and the others are also the same.

Any macroblock including the edge among the macroblocks A to K is omitted from the target to be calculated because it is thought that the feature of its pattern may be changed. The error correction circuit 211 calculates each sum value of values at the left position, the upper left position, the upper position, and the upper right position, respectively, based on the results of calculation in consideration of edge determination results in the edge detection circuit 210.

Referring to FIG. 17A, there are sum values such as SUM_X1 to SUM_X4 and SUM_Y. A ratio RA related to the macroblock on the left side of the error macroblock is RA=SUM_X1/SUM_Y obtained by using the sum values, and a ratio RB related to the macroblock on the upper left side of the error macroblock is RB=SUM_X2/SUM_Y. Likewise, a ratio RC related to the macroblock on the upper side of the error macroblock is RC=SUM_X3/SUM_Y, and a ratio RD related to the macroblock on the upper right side of the error macroblock is RD=SUM_X4/SUM_Y.

By using these ratios RA to RD, a value ERROR (x) of a reference vector for the error macroblock in the x direction is ERROR (x)=RA×A(x)+RB×B(x)+RC×C(x)+RD×D(x), where A(x) is a value of a motion vector of A in the x direction, and the others are also the same.

A value of the reference vector for the error macroblock in the y direction can also be calculated in the same manner as the value in the x direction. More specifically, |A−E| shown in FIG. 17A is set as an absolute value of a difference between motion vectors of A and E in the y direction, and the other values are also set as absolute values of respective differences between motion vectors of relevant macroblocks, thereby calculating values in the y direction.

Figure 18:
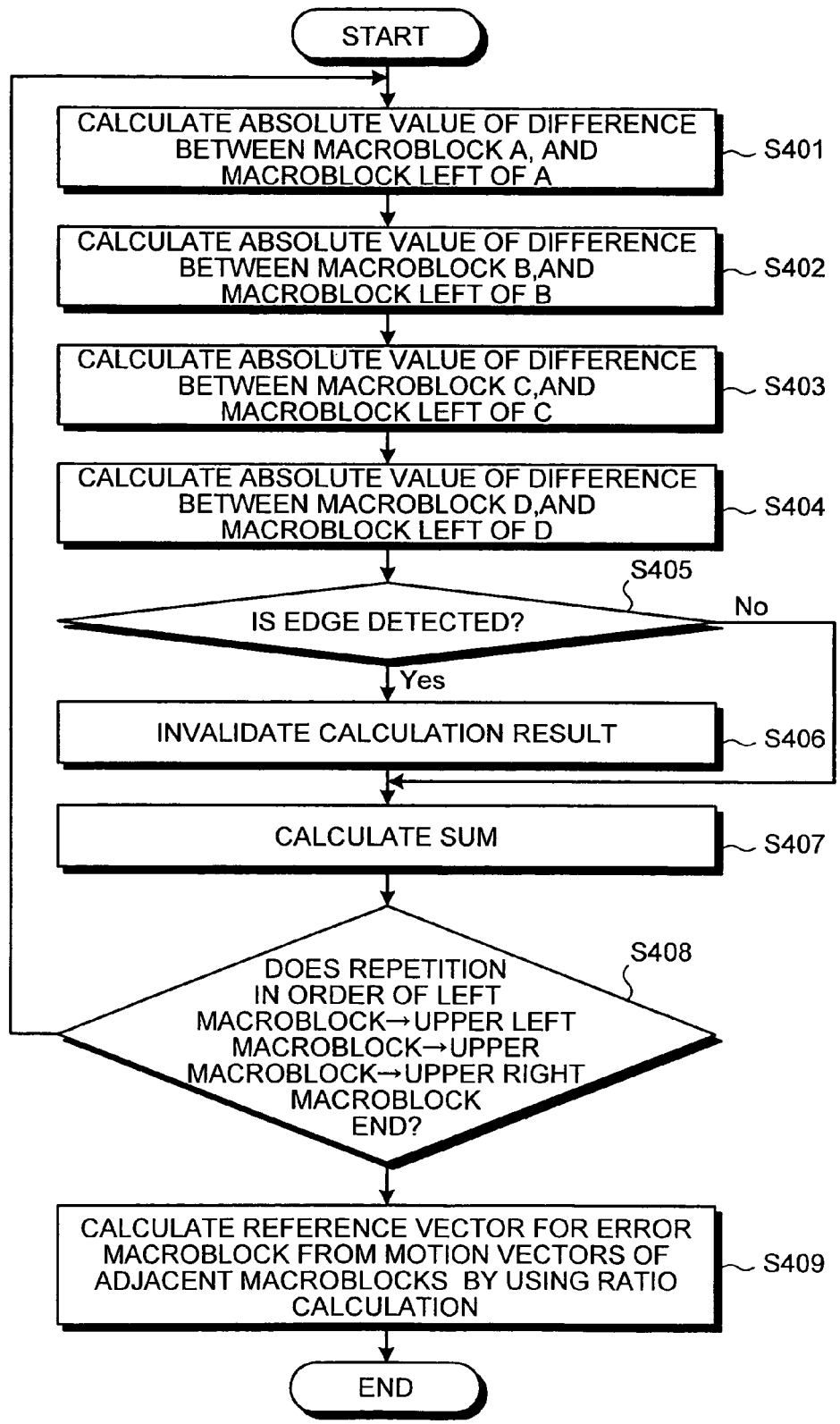
FIG. 18 is a flowchart of a reference vector calculation process performed by the error correction circuit.

FIG. 18 is a flowchart of a reference vector calculation process performed by the error correction circuit 211. The error correction circuit 211 calculates an absolute value |A−E| of the difference between A, being the adjacent macroblock to the error macroblock, and the left macroblock of A using the motion vectors stored in the correction parameter memory 209 (step S401), and calculates an absolute value |B−F| of the difference between B, being the adjacent macroblock, and the left macroblock of B (step S402).

Similarly, the error correction circuit 211 calculates an absolute value |C−B| of the difference between C, being the adjacent macroblock, and the left macroblock of C (step S403), and calculates an absolute value |D−C| of the difference between D, being the adjacent macroblock, and the left macroblock of D (step S404).

The error correction circuit 211 determines whether there is any macroblock in which edge is detected by the edge detection circuit 210 (step S405). If there is a macroblock with the edge detected, the error correction circuit 211 invalidates the result of calculation using the motion vector of the macroblock (step S406).

The error correction circuit 211 then calculates the sum value SUM_X1 (step S407), and also calculates the absolute value of the difference between the adjacent macroblock and its upper left macroblock, the absolute value of the difference between the adjacent macroblock and its upper macroblock, and the absolute value of the difference between the adjacent macroblock and its upper right macroblock, to calculate the sum values SUM_X2, SUM_X3, and SUM_X4 (which are repeated based on "No" as the determination result at step S408).

Then, the error correction circuit 211 calculates SUM_Y and calculates ratios RA to RD, to calculate a reference vector for the error macroblock by using the ratios RA to RD calculated (step S409).

In this manner, the error correction circuit 211 calculates the reference vector for the error macroblock using the motion vectors stored in the correction parameter memory 209, thereby calculating the reference vector without the motion search circuit mounted thereon. Therefore, high-precision error correction can be performed without an increase in the circuit scale and the decoding process time.

Each vector difference between each of the adjacent macroblocks (A to D) to the error macroblock and each of macroblocks situated at the left position, the upper left position, the upper position, and the upper right position is calculated herein, and the results of calculation are used to calculate each ratio of motion vectors of the macroblocks at the left position, the upper left position, the upper position, and the upper right position when a reference vector for the error macroblock is calculated. However, the ratio can also be calculated by using each correlation between each of the adjacent macroblocks (A−D) to the error macroblock and each macroblock adjacent to the adjacent macroblock.

FIG. 19 is a schematic of a calculation equation of a denominator and a numerator in a ratio when the ratio is calculated using a correlation between adjacent macroblocks. In FIG. 19, A to K indicate the macroblocks shown in FIG. 17B. Further, |A−E| indicates an absolute value of a difference between motion vectors of A and E in the x direction, and the others are also the same.

Referring to FIG. 19, there are sum values such as SUM_X1 to SUM_X4 and SUM_Y. A ratio RA related to the macroblock on the left side of the error macroblock is RA=SUM_X1/SUM_Y obtained by using the sum values, and a ratio RB related to the macroblock on the upper left side of the error macroblock is RB=SUM_X2/SUM_Y. Likewise, a ratio RC related to the macroblock on the upper side of the error macroblock is RC=SUM_X3/SUM_Y, and a ratio RD related to the macroblock on the upper right side of the error macroblock is RD=SUM_X4/SUM_Y.

By using these ratios RA to RD calculated, a value ERROR (x) of a reference vector for the error macroblock in the x direction is ERROR (x)=RA×A(x)+RB×B(x)+RC×C(x)+RD×D(x), where A(x) is a value of a motion vector of A in the x direction, and the others are also the same.

A value of the reference vector for the error macroblock in the y direction can also be calculated in the same manner as the value in the x direction. More specifically, |A−E| shown in FIG. 19 is set as an absolute value of the difference between motion vectors of A and E in the y direction, and the other values are also set as absolute values of respective differences between motion vectors of relevant macroblocks, thereby calculating values in the y direction.

Figure 20:
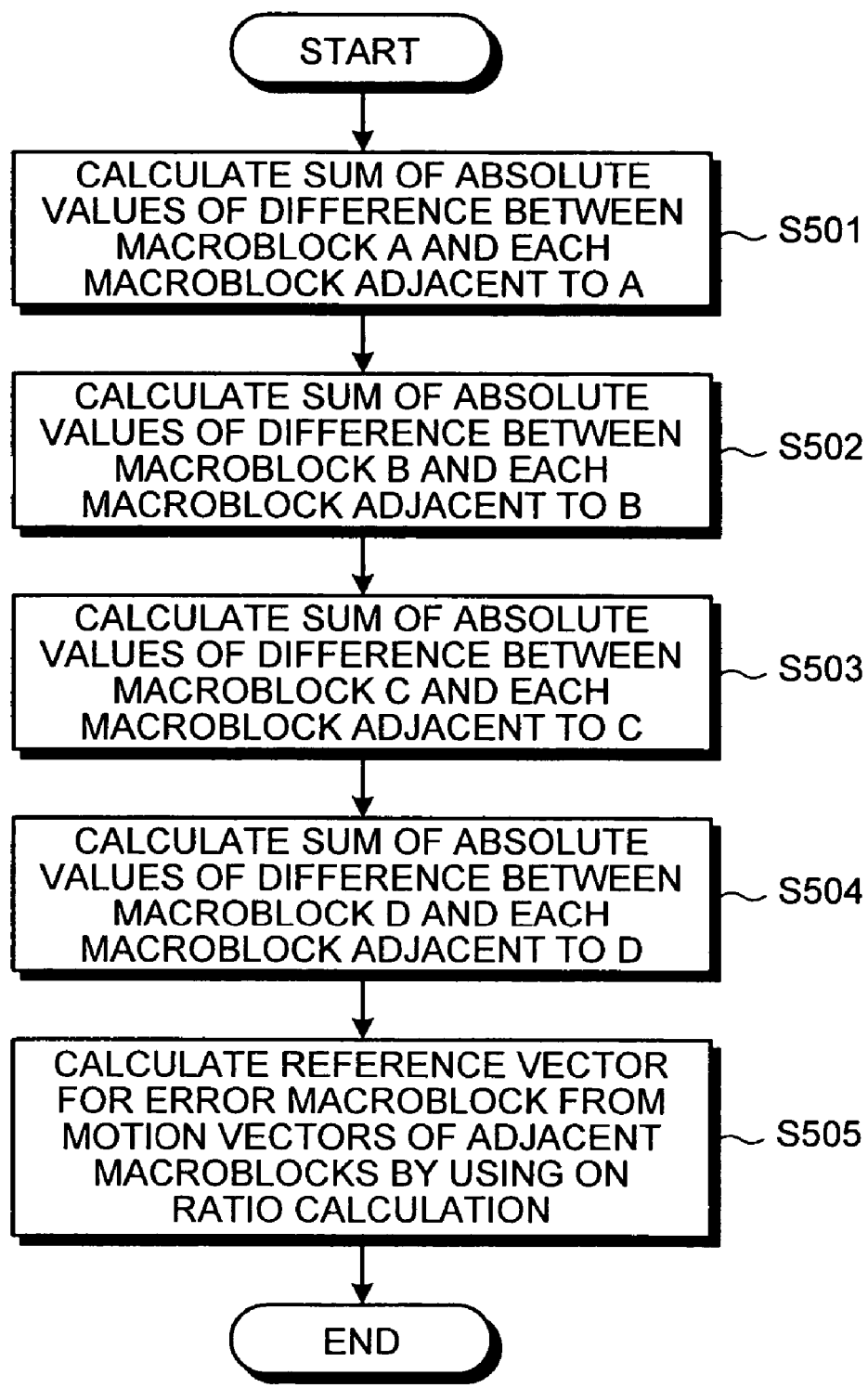
FIG. 20 is a flowchart of a reference vector calculation process performed by the error correction circuit using the calculation equation of FIG. 19.

FIG. 20 is a flowchart of a reference vector calculation process performed by the error correction circuit 211 using the calculation equation in FIG. 19. The error correction circuit 211 calculates a sum of absolute values |A−E|+|A−F|+|A−B|+|A−C| of the difference between A, which is the macroblock adjacent to the error macroblock, and each adjacent macroblock to A, using the motion vectors stored in the correction parameter memory 209 (step S501), and calculates a sum of absolute values |B−F|+|B−G|+|B−H|+|B−I| of the difference between B, being the adjacent macroblock, and each adjacent macroblock to B (step S502).

Similarly, the error correction circuit 211 calculates a sum of absolute values |C−B|+|C−H|+|C−I|+|C−J| of the difference between C, being the adjacent macroblock, and each adjacent macroblock to C (step S503), and calculates a sum of absolute values |D−C|+|D−I|+|D−J|+|D−K| of the difference between D, being the adjacent macroblock, and each adjacent macroblock to D (step S504).

Then, the error correction circuit 211 calculates SUM_Y and calculates ratios RA to RD, to calculate a reference vector for the error macroblock by using the ratios RA to RD calculated (step S505).

By comparing the operation shown in FIG. 17A and FIG. 18 with the operation shown in FIG. 19 and FIG. 20, it can be understood that the operation shown in FIG. 17A and FIG. 18 has a feature such that the degree of vector correction of a portion including the edge is high while the operation shown in FIG. 19 and FIG. 20 has a feature such that the influence in the event of an erroneous detection by using a correlation can be suppressed to low.

Details of an operation for calculating a difference value of DC components for the error macroblock in the error correction circuit 211 are explained below. The error correction circuit 211 calculates each difference value of DC components for respective four blocks in the error macroblock.

FIG. 21 is a schematic of blocks used to calculate difference values of DC components. Adjacent macroblocks are set to A to D, and the adjacent macroblock A consists of A1 to A4 blocks, the adjacent macroblock B consists of B1 to B4 blocks, the adjacent macroblock C consists of C1 to C4 blocks, and the adjacent macroblock D consists of D1 to D4 blocks. The error correction circuit 211 uses blocks A2, B4, C3, and C4 to calculate each difference value of DC components for block (1) in the error macroblock, uses blocks (1), C3, C4, and D3 to calculate each difference value of DC components for block (2) in the error macroblock, uses blocks A4, A2, block (1), and block (2) to calculate each difference value of DC components in block (3) in the error macroblock, and uses block (1), block (2), and block (3) to calculate each difference value of DC components for block (4) in the error macroblock.

Figure 13:
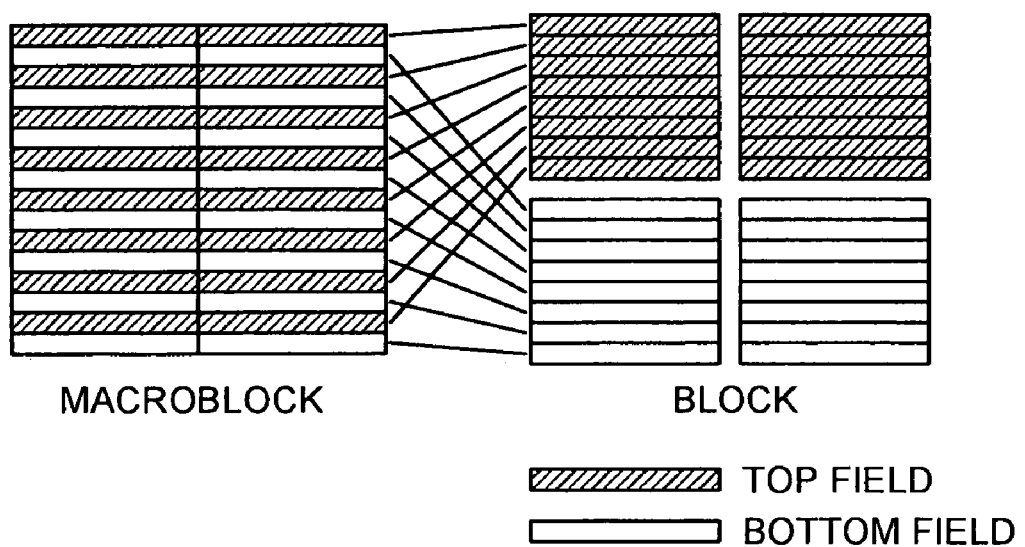
FIG. 13 is a diagram of field DCT.

If there is any macroblock of which DCT type is the field DCT in blocks of adjacent macroblocks to be used for calculation for the blocks (1) to (4), it is necessary to previously average values between the blocks. This is because, as shown in FIG. 13, images of a top field or a bottom field are continuously provided in either one of relevant blocks. For example, If A, being the adjacent macroblock, is a field DCT, blocks of A2 and A4 are necessary to be averaged, and 8×8=64 elements obtained by respectively averaging 8×8=64 elements of A2 and 8×8=64 elements of A4 are used as difference values of DC components for A2 and A4.

The operation of calculating a difference value of DC components for the error macroblock is basically the same as the operation of calculating the reference vector, and indicates here the operation of calculating a difference value of DC components based on the block (1) of the error macroblock that is set as a block to be corrected. However, this goes for the same as the operation of calculating a difference value of DC components in other blocks.

The blocks used to calculate each difference value of DC components for the block (1) in the error macroblock are four blocks of A2, B4, C3, and C4. The error correction circuit 211 calculates each difference between difference values of DC components of the blocks and respective blocks situated at the left position, the upper left position, the upper position, and the upper right position. The error correction circuit 211 calculates a ratio (weight of a weighted average) between difference values of DC components in the left, the upper left, the upper, and the upper right blocks used to calculate each difference value of DC components for the block (1) in the error macroblock using the results. It is noted that any macroblock including the edge is omitted from a target to be calculated.

FIG. 22 is a schematic to explain a calculation equation of a denominator and a numerator in each ratio between difference values of DC components of blocks at the left position, the upper left position, the upper position, and the upper right position with respect to the block (1) when a difference value of DC components for the block (1) is calculated. In FIG. 22, A1, A2, B1 to B4, C1 to C4, and D1 indicate the blocks shown in FIG. 21. Furthermore, |A2−A1| indicates the calculation result of absolute values of the difference between difference values of DC components in the respective blocks for each one of 8×8=64 elements.

Any macroblock including the edge among the macroblocks A1 to D1 is omitted from a target to be calculated because it is thought that a feature of a pattern may be changed. The error correction circuit 211 calculates respective sum values of the blocks at the left position, the upper left position, the upper position, and the upper right position based on the result of calculation in consideration with the edge determination result in the edge detection circuit 210.

A ratio RA between adjacent blocks on the left side of the block to be corrected is RA=SUM_X1/SUM_Y obtained by using the sum values SUM_X1 to SUM_X4 and SUM_Y shown in FIG. 22, and a ratio RB between adjacent blocks on the upper left side of the block to be corrected is RB=SUM_X2/SUM_Y. Likewise, a ratio RC between adjacent blocks on the upper side of the block to be corrected is RC=SUM_X3/SUM_Y, and a ratio RD between adjacent blocks on the upper right side of the block to be corrected is RD=SUM_X4/SUM_Y.

By using these ratios RA to RD, a difference value ERROR (DC) of DC components for the block to be corrected is ERROR (DC)=RA×A2(DC)+RB×B4(DC)+RC×C3(DC)+RD×C4(DC), where A2(DC) indicates difference values of DC components related to A2, and the others are also the same.

Figure 23:
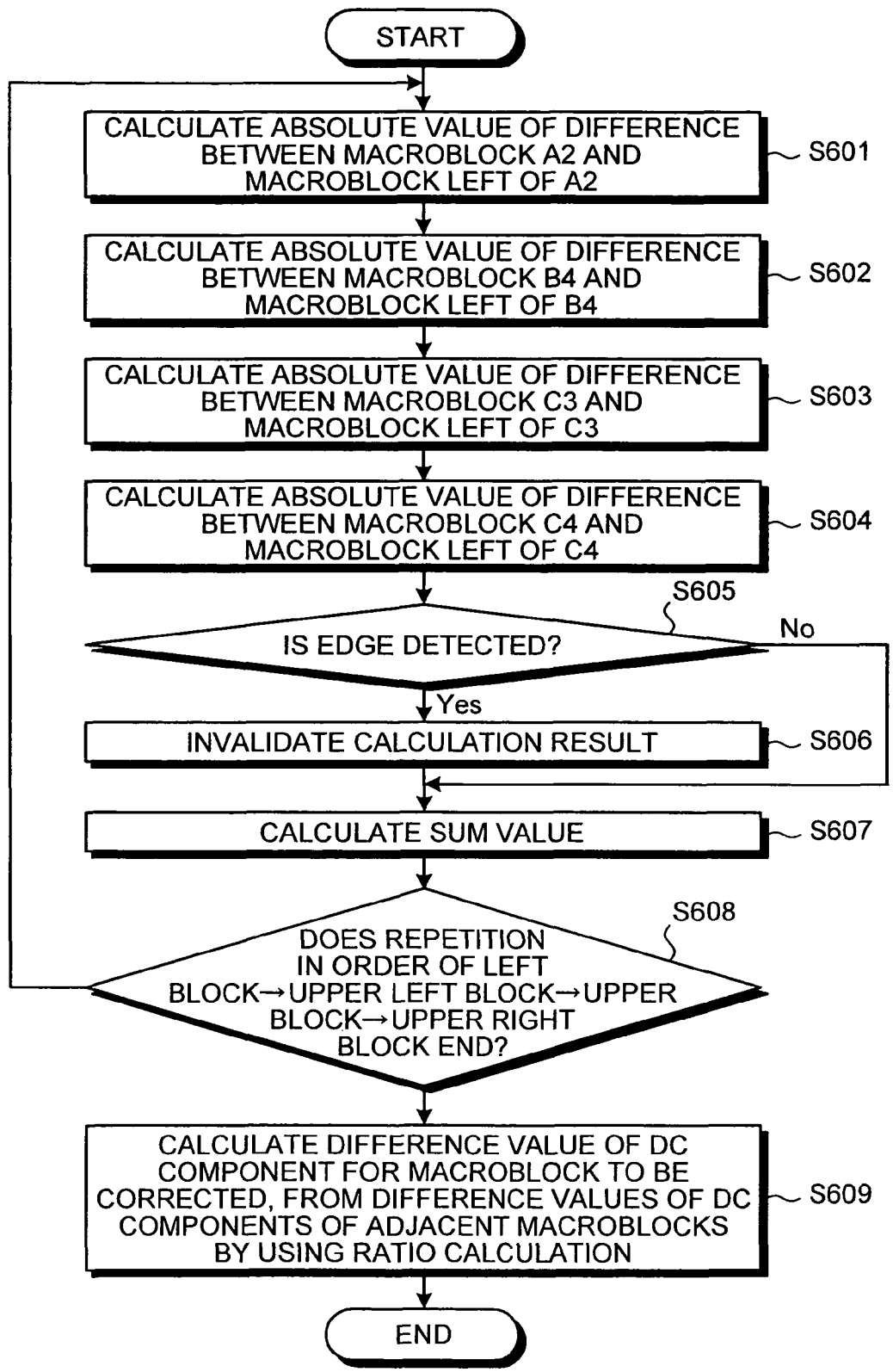
FIG. 23 is a flowchart of a difference value calculation process performed by the error correction circuit to calculate DC components.

FIG. 23 is a flowchart of a difference value calculation process performed by the error correction circuit 211. The error correction circuit 211 calculates an absolute value |A2−A1| of the difference between A2, being the adjacent block to the block to be corrected, and a block on the left side of A2, using the difference values of DC components stored in the correction parameter memory 209 (step S601), and calculates an absolute value |B4−B3| of the difference between B4, being the adjacent block, and a block on the left side of B4 (step S602).

Similarly, the error correction circuit 211 calculates an absolute value |C3−B4| of the difference between C3, being the adjacent block, and a block on the left side of C3 (step S603), and calculates an absolute value |C4−C3| of the difference between C4, being the adjacent block, and a block on the left side of C4 (step S604).

The error correction circuit 211 determines whether there is any macroblock in which the edge is detected by the edge detection circuit 210 (step S605). If there is the macroblock with the edge detected (step S605, Yes), the error correction circuit 211 invalidates the result of calculation using the difference value of DC components for the macroblock (step S606).

The error correction circuit 211 then calculates the sum value SUM_X1 (step S607), and also calculates the absolute value of the difference between the adjacent block and the upper left block, the absolute value of the difference between the adjacent block and the upper block, and the absolute value of the difference between the adjacent block and the upper right block, to calculate the sum values SUM_X2, SUM_X3, and SUM_X4 (which are repeated based on "No" as the determination result at step S608).

Then, the error correction circuit 211 calculates SUM_Y, calculates ratios RA to RD, to calculate a difference value of DC components for the block to be corrected by using the ratios RA to RD calculated (step S609).

In this manner, the error correction circuit 211 calculates the difference value of DC components for the error macroblock using the difference values of DC components stored in the correction parameter memory 209, thereby correcting the error macroblock further highly precisely.

Each absolute value of the difference between difference values of DC components is calculated herein. The difference values of DC components are between adjacent blocks to the block to be corrected, and blocks situated at the left position, the upper left position, the upper position, and the upper right position. The results of calculation are used to calculate each ratio between difference values of DC components of the adjacent blocks and the blocks at the left position, the upper left position, the upper position, and the upper right position, respectively, when a difference value of DC components for the block to be corrected is calculated. However, the ratio can also be calculated by using each correlation between a block adjacent to the block to be corrected, and an adjacent block to the block.

FIG. 24 is a schematic to explain a calculation equation of a denominator and a numerator in a ratio when the ratio is calculated using a correlation between adjacent macroblocks. Referring to FIG. 24, there are sum values such as SUM_X1 to SUM_X4 and SUM_Y. A ratio RA between adjacent blocks on the left side of the block to be corrected is RA=SUM_X1/SUM_Y obtained by using the sum values SUM_X1 to SUM_X4 and SUM_Y shown in FIG. 24, and a ratio RB between adjacent blocks on the upper left side of the block to be corrected is RB=SUM_X2/SUM_Y. Likewise, a ratio RC between adjacent blocks on the upper side of the block to be corrected is RC=SUM_X3/SUM_Y, and a ratio RD between adjacent blocks on the upper right side of the block to be corrected is RD=SUM_X4/SUM_Y.

By using these ratios RA to RD, a difference value ERROR (DC) of DC components for the block to be corrected is ERROR (DC)=RA×A2(DC)+RB×B4(DC)+RC×C3(DC)+RD×C4(DC), where A2(DC) indicates difference values of DC components related to A2, and the others are also the same.

Figure 25:
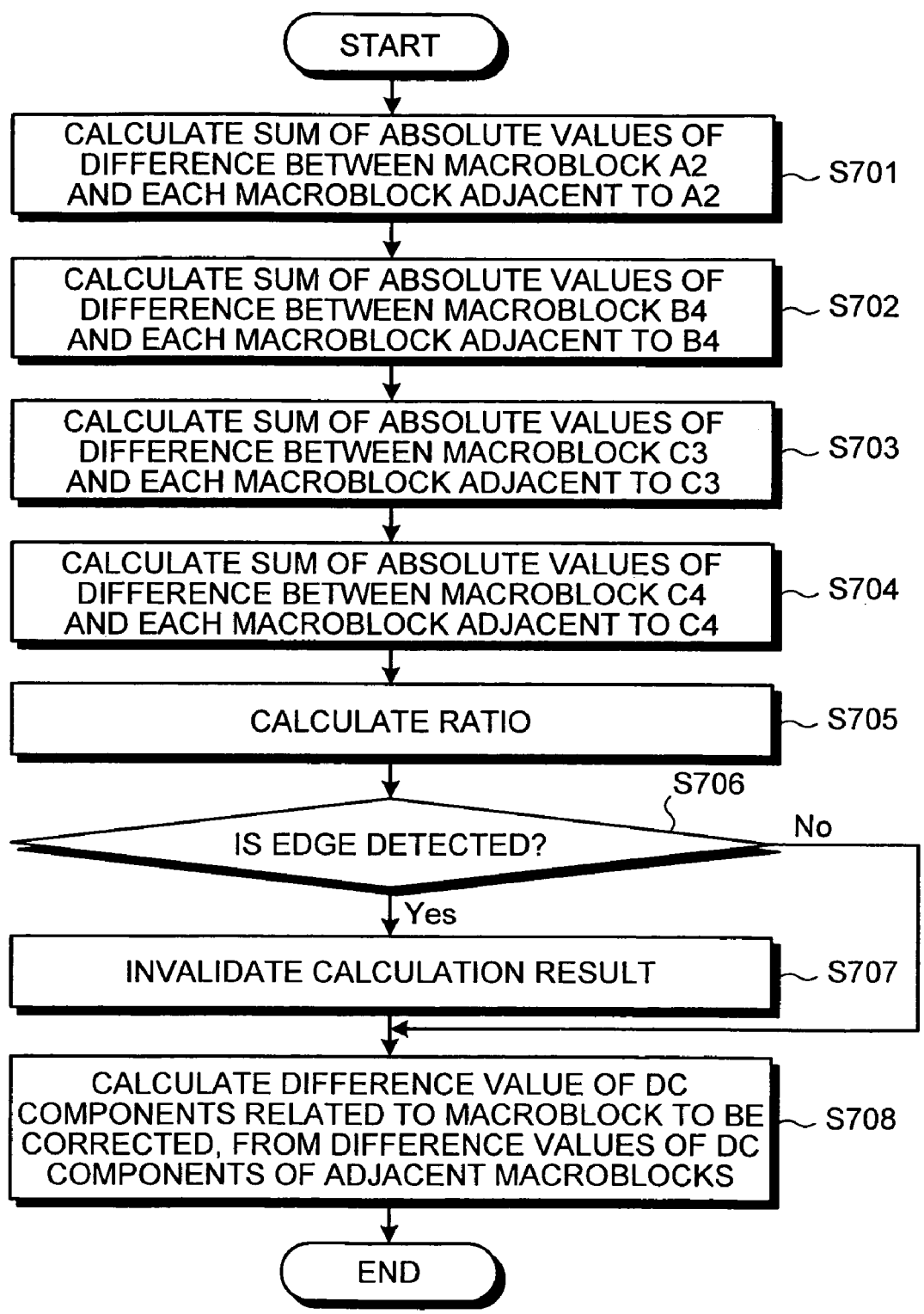
FIG. 25 is a flowchart of a difference value calculation process performed by the error correction circuit to calculate DC components using the calculation equation of FIG. 24.

FIG. 25 is a flowchart of a difference value calculation process performed by the error correction circuit 211 to calculate DC components using the calculation equation shown in FIG. 24. The error correction circuit 211 calculates a sum of absolute values |A2−A1|+|A2−B3|+|A2−B4|+|A2−C3| of the difference between A2, being the adjacent block to the block to be corrected, and each adjacent block to A2, using the difference values of DC components stored in the correction parameter memory 209 (step S701), and calculates a sum of absolute values |B4−B3|+|B4−B1|+|B4−B2|+|B4−C1| of the difference between B4, being the adjacent block, and each adjacent block to B4 (step S702).

Similarly, the error correction circuit 211 calculates a sum of absolute values |C3−B4|+|C3−B2|+|C3−C1|+|C3−C2| of the difference between C3, being the adjacent block, and each adjacent block to C3 (step S703), and calculates a sum of absolute values |C4−C3|+|C4−C1|+|C4−C2|+|C4−D1| of the difference between C4, being the adjacent block, and each adjacent block to C4 (step S704).

Then, the error correction circuit 211 calculates SUM_Y to calculate ratios RA to RD (step S705), and determines whether there is any macroblock where the edge is detected by the edge detection circuit 210 (step S706). If there is an macroblock including the edge detected as the result of determination, the error correction circuit 211 invalidates the result of calculation using the difference value of DC components for the macroblock (step S707), and calculates difference values of DC components related to the block to be corrected, using the ratios RA to RD (step S708).

As explained above, the variable-length decoding circuit 201 stores a motion vector decoded from the bit stream 200a in the correction parameter memory 209 for each macroblock, and the error correction circuit 211 calculates a reference vector for the error macroblock using the motion vectors to generate a corrected picture from a reference picture. Therefore, the corrected picture can be generated from the reference picture without the need to provide a motion search circuit in the error correction circuit.

Moreover, the inverse-orthogonal transform circuit 204 stores a difference value 204b of DC components, after IDCT is processed thereto, in the correction parameter memory 209 for each macroblock, and the error correction circuit 211 calculates a difference value of DC components for the error macroblock using the difference values of DC components, to add the difference value of DC components to the corrected picture generated from the reference picture. Therefore, the corrected picture can be generated further highly precisely.

The MPEG decoder explained above can be implemented on a computer with software, i.e., a MPEG decoding program.

Figure 26:
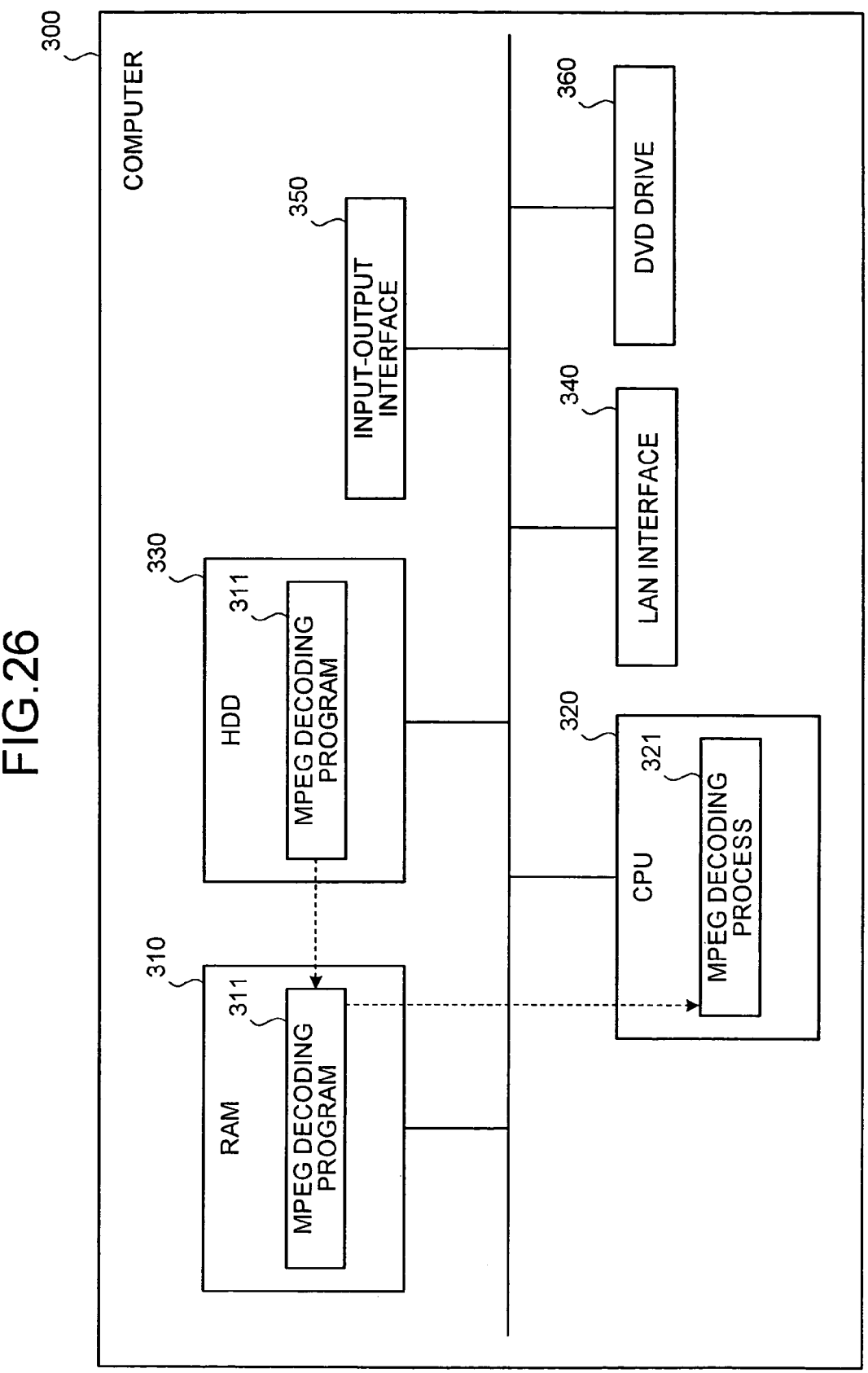
FIG. 26 is a functional block diagram of a computer that executes an MPEG decoding program according to the embodiment.

FIG. 26 is a functional block diagram of a computer 300 that executes the MPEG decoding program according to the embodiment. The computer 300 includes Random Access Memory (RAM) 310, a Central Processing Unit (CPU) 320, a Hard Disk Drive (HDD) 330, a Local Area Network (LAN) interface 340, an input-output interface 350, and a Digital Versatile Disk (DVD) drive 360.

The RAM 310 is memory that stores program and information on the progress of execution of the program, and the CPU 320 reads the program from the RAM 310 and executes it.

The HDD 330 is a disk drive that stores a program and data, and the LAN interface 340 is an interface used to connect the computer 300 to another computer through the LAN.

The input-output interface 350 is an interface used to connect an input device such as a mouse and keyboard and a display unit to the computer 300, and the DVD drive 360 writes and reads data to and from the DVD.

An MPEG decoding program 311 executed by the computer 300 is stored in the DVD and read out from the DVD by the DVD drive 360, to be installed in the computer 300.

Alternatively, the MPEG decoding program 311 can be stored in a database or the like of another computer and that computer can be connected to the computer 300 through the LAN interface 340. The MPEG decoding program 311 can then be read out from another computer and installed in the computer 300.

The MPEG decoding program 311 can as well be stored in the HDD 330, read out therefrom to the RAM 310, and is executed as an MPEG decoding process 321 by the CPU 320.

According to one aspect of the present invention, high-precision error correction is performed using motion vectors without performing motion search. Therefore, error correction can be performed highly precisely without increase in the circuit scale.

According to another aspect of the present invention, a difference value between direct-current (DC) components between adjacent blocks is reflected in a corrected picture. Therefore, the quality of a corrected picture can be further improved.

According to still another aspect of the present invention, an unnecessary reference vector is omitted, and hence, decoding can be performed speedily.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A moving picture decoding apparatus that processes an encoded bit stream to obtain a moving picture, wherein the encoded bit stream represents a moving picture that has been encoded using a motion vector of each of an array of block in each frame of the moving picture, the moving picture decoding apparatus comprising:
   a storing unit that
     stores therein motion vectors detected from the encoded bit stream of each block, and
     stores skip-block information as correction information for each block, the skip-block information being detected from the encoded bit stream and indicating whether a reference location of a reference target frame is a location same as a reference source frame;
   an error correction unit that
     counts number of skip-block adjacent to an error block based on the skip-block information,
     determines not to use the motion vector for correcting the error block, when the number of skip-block exceeds a predetermined threshold,
     detects at least one block adjacent to the error block, which is decided based on motion vectors stored in the storing unit,
     corrects the value of an adjacent block based on a value of a block in a reference frame that corresponds to the adjacent block, and
     specifies a block by the motion vector of a block adjacent to the error block as a corrected picture for the error block; and
   a motion-vector necessity determination unit that determines whether the motion vector is used to correct the error block, based on skip-block information for a block adjacent to the error block, among the skip-block information stored by the storing unit.

2. The moving picture decoding apparatus according to claim 1, wherein the adjacent block is a block that is on any of left, above-left, above, and above-right of the error block.

3. The moving picture decoding apparatus according to claim 1, wherein the error correction unit determines a weighted average of motion vectors of the blocks adjacent to the error block, as a reference vector for the error block, and sets a block referred to from a reference frame, as a corrected picture for the error block based on the reference vector.

4. The moving picture decoding apparatus according to claim 3, wherein when detecting an edge of a block upon calculation of a weight of the motion vector of the block adjacent to the error block, the error correction unit omits the motion vector in which the edge is detected during calculation of the weight, from a target of the weighted average.

5. The moving picture decoding apparatus according to claim 1, wherein the storing unit further stores therein for each block a correction information that is a difference between direct-current components detected from the encoded bit stream, and
   the error correction unit corrects the corrected picture using a difference value between direct-current components of blocks adjacent to the error block, among difference values between direct-current components stored by the storing unit.

6. The moving picture decoding apparatus according to claim 1, further comprising:
   an error area identifying unit that identifies an error area that are blocks starting from the error block and ending with a recoverable block.

7. The moving picture decoding apparatus according to claim 1, wherein the moving picture encoding apparatus encodes a moving picture using Moving Picture Experts Group (MPEG), and the block is a macroblock.

8. The moving picture decoding apparatus according to claim 1, wherein
   the encoded bit stream includes a temporal reference, and
   the error correction unit decides an error area that is across the frames, by using the temporal reference value.

9. A method of decoding moving picture including processing an encoded bit stream to obtain a moving picture, wherein the encoded bit stream represents a moving picture that has been encoded using a motion vector of each of an array of block in each frame of the moving picture, the method comprising:
   storing motion vectors detected from the encoded bit stream of each block;
   storing skip-block information as correction information for each block, the skip-block information being detected from the encoded bit stream and indicating whether a reference location of a reference target frame is a location same as a reference source frame;
   counting number of skip-block adjacent to an error block based on the skip-block information;
   determining not to use the motion vector for correcting the error block, when the number of skip-block exceeds a predetermined threshold;
   detecting at least one block adjacent to the error block, which is decided based on motion vectors stored in the storing unit;
   correcting the value of an adjacent block based on a value of a block in a reference frame that corresponds to the adjacent block;
   determining whether the motion vector is used to correct the error block, based on skip-block information for a block adjacent to the error block, among skip-block information stored by the storing; and specifying a block by the motion vector of a block adjacent to the error block as a corrected picture for the error block.

10. A non-transitory computer-readable recording medium that stores therein a computer program that implements on a computer a method of decoding moving picture including processing an encoded bit stream to obtain a moving picture, wherein the encoded bit stream represents a moving picture that has been encoded using a motion vector of each of an array of block in each frame of the moving picture, the computer program causing the computer to execute:

storing motion vectors detected from the encoded bit stream of each block;

storing skip-block information as correction information for each block, the skip-block information being detected from the encoded bit stream and indicating whether a reference location of a reference target frame is a location same as a reference source frame;

counting number of skip-block adjacent to an error block based on the skip-block information;

determining not to use the motion vector for correcting the error block, when the number of skip-block exceeds a predetermined threshold;

detecting at least one block adjacent to the error block, which is decided based on motion vectors stored in the storing unit, and correcting the value of an adjacent block based on a value of a block in a reference frame that corresponds to the adjacent block;

determining whether the motion vector is used to correct the error block, based on skip-block information for a block adjacent to the error block, among skip-block information stored by the storing; and specifying a block by the motion vector of a block adjacent to the error block as a corrected picture for the error block.

* * * * *